United States Patent
Tsai et al.

(10) Patent No.: US 10,855,351 B1
(45) Date of Patent: Dec. 1, 2020

(54) HYBRID DIRECTIONAL ANTENNA SYSTEM

(71) Applicant: Amazon Technologies, Inc., Seattle, WA (US)

(72) Inventors: Kun Ting Tsai, Fremont, CA (US); Kiran Kumar Edara, Cupertino, CA (US); Sarang Wagholikar, Sunnyvale, CA (US); Omar Fawazhashim Zakaria, Santa Clara, CA (US); Ashish Kumar Shukla, Milpitas, CA (US); Tzung-I Lee, San Jose, CA (US); Ali Mirkamali, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 72 days.

(21) Appl. No.: 16/215,186

(22) Filed: Dec. 10, 2018

(51) Int. Cl.
  *H04B 7/06* (2006.01)
  *H01Q 21/28* (2006.01)
  *H01Q 21/29* (2006.01)
  *H04B 17/327* (2015.01)
  *H01Q 25/00* (2006.01)

(52) U.S. Cl.
  CPC .......... *H04B 7/0608* (2013.01); *H01Q 21/28* (2013.01); *H01Q 21/29* (2013.01); *H01Q 25/002* (2013.01); *H04B 7/063* (2013.01); *H04B 7/0626* (2013.01); *H04B 17/327* (2015.01)

(58) Field of Classification Search
  None
  See application file for complete search history.

(56) References Cited

U.S. PATENT DOCUMENTS

| | | | |
|---|---|---|---|
| 2005/0075142 A1* | 4/2005 | Hoffmann | H04B 7/0695 455/562.1 |
| 2008/0026797 A1* | 1/2008 | Nanda | H04B 15/00 455/562.1 |

* cited by examiner

*Primary Examiner* — Kouroush Mohebbi
(74) *Attorney, Agent, or Firm* — Lowenstein Sandler LLP

(57) ABSTRACT

A wireless device includes a radio, a first directional antenna, a second directional antenna, an omnidirectional antenna, and a switch selectively coupled between the radio and the first directional antenna, the second directional antenna, and the omnidirectional antenna. A processor is coupled to the switch and to, for a frame: determine, based on an arbitration table, a destination medium access control address of a client wireless device and identifiers of antennas for transmitting the frame and receiving acknowledgement data; cause the switch to couple the radio to the first directional antenna; transmit the frame to the client wireless device via the first directional antenna, wherein the first client wireless device is located along a first direction with respect to the wireless device; cause the switch to couple the radio to the omnidirectional antenna; and receive an acknowledgment, corresponding to the frame, from the client wireless device via the omnidirectional antenna.

20 Claims, 15 Drawing Sheets

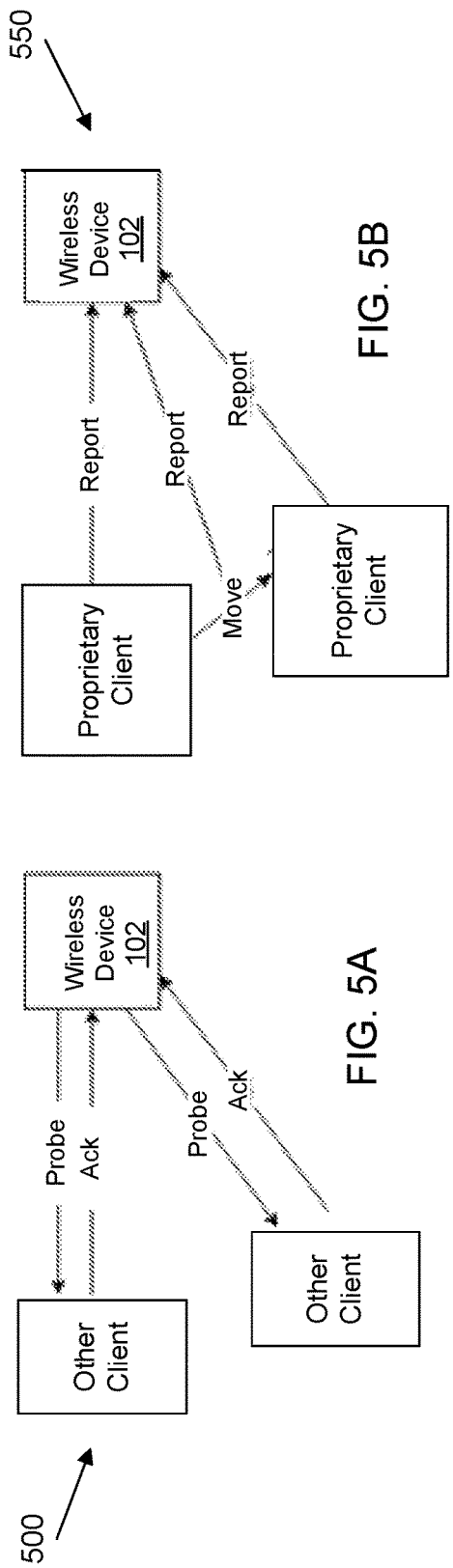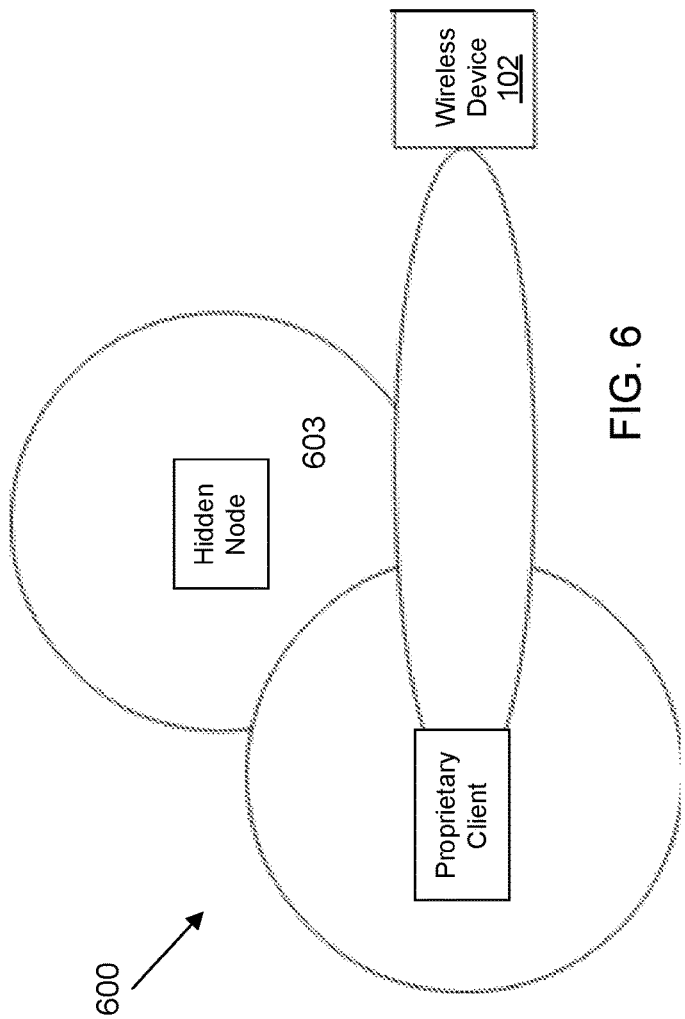

HYBRID DIRECTIONAL ANTENNA SYSTEM

BACKGROUND

Many buildings such as homes, retail stores, business centers, and the like, have wireless routers with an access point that transmits data to a client wireless device using an omnidirectional antenna. Because the antenna is omnidirectional, the access point can connect to the client wireless device from many different directions. Use of the omnidirectional antenna, however, spreads out radio frequency (RF) energy omnidirectionally, preventing the access point from delivering a strong, focused signal to the client wireless device.

BRIEF DESCRIPTION OF DRAWINGS

The present disclosures will be understood more fully from the detailed description given below and from the accompanying drawings of various embodiments of the present disclosure, which, however, should not be taken to limit the present disclosure to the specific embodiments, but are for explanation and understanding only.

FIG. 5A is a diagram of the hybrid directional antenna system actively probing third-party client wireless devices according to an embodiment.

FIG. 5B is a diagram of the hybrid directional antenna system receiving signal quality reports from proprietary client wireless devices according to an embodiment.

FIG. 6 is a diagram of detection of a strong hidden node in communicating with a proprietary client wireless device according to an embodiment.

DETAILED DESCRIPTION

Figure 1A:
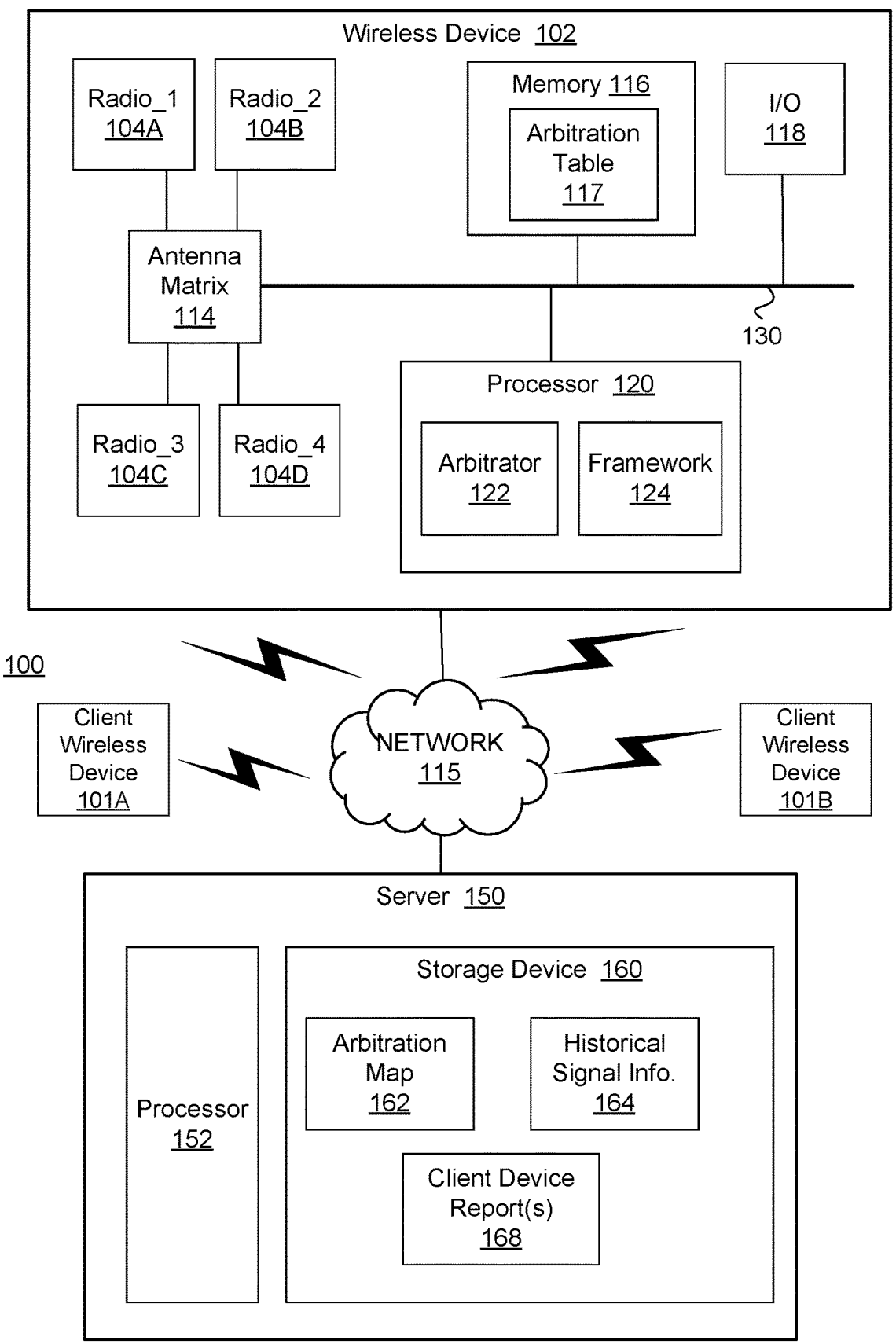
FIGS. 1A, 1B, 1C, 1D, and 1E are block diagrams of a hybrid directional antenna system to enhance connectivity of a wireless access point device to client wireless devices according to various embodiments.

To improve the concentration of RF energy in certain situations, particularly for better connectivity with client wireless devices in buildings and homes, the disclosed wireless access point (AP) devices may employ directional antennas along with the conventional omnidirectional antenna in a hybrid directional antenna system. The wireless AP device may further leverage framework-level data and cloud server computing to determine the best direction at which to transmit and/or receive electromagnetic energy, which includes a choice of whether to use an omnidirectional antenna or a particular directional antenna for each frame that is transmitted and for receipt of acknowledgments. By using environmental intelligence, the wireless AP device may program switching by a matrix of antennas, to control this choice of antennas on a per-frame basis. In this way, the embodiments are able to provide hybrid antenna functionality using the framework-level data and results from the cloud computing. A frame may be understood to be a digital data transmission unit in computing networking and telecommunication. Each frame may include frame synchronization features including a sequence of bits or symbols, which indicate to the receiver the beginning and end of a packet of data within the stream of symbols or bits that is received.

Conventionally APs only use omnidirectional antennas. APs do not conventionally use point-to-point wireless connections, which require manual physical alignment of the antennas, or electrical alignment of the antennas using phase shifters. Physical alignment requires installation personnel to physically (and manually) aligning the antenna radiation pattern using laser beams or other sophisticated radio frequency measurement equipment. Phase shifter alignment requires expensive and large antenna arrays and do not provide wide angle coverage. Furthermore, traditional directional antenna systems are fixed systems where the associated wireless devices do not move after deployment, making these systems unsuitable for service home client devices as the client wireless devices may move around from time to time according to user needs, space renovation, and the like.

In various embodiments, the disclosed hybrid directional antenna system (or simply "system") may employ an antenna matrix made up of a combination of directional and omnidirectional antennas. A processor (or other processing device) of the wireless AP device, which employs the hybrid directional antenna system, may dynamically direct the radio frequency (RF) beam through the antenna matrix to connect to respective client wireless devices through use of digital, analog, and framework-level data that are either directly gathered or downloaded from a cloud server. For example, the wireless AP device performs dynamic sensing by computing or receiving application-level data from the cloud or from client wireless devices in order to determine antenna assignments. Such intelligent antenna assignments allow the AP to assign a different antenna path through the antenna matrix for different client wireless devices in real time and as different client wireless devices change location. For example, the dynamic sensing may determine, in part, radio level signal quality such as received signal strength or channel properties information. The application-level data may include data that specifies an application-level service requirement, a client device capability, an attribute of a nearby wireless environment, and the historical traffic pattern of each of the client wireless devices. In this way, software processing of data facilitates particular switching of the antenna matrix, which is flexible to accommodate wireless connections with the client wireless device, even while the client wireless device changes locations.

In one implementation, a wireless AP device may include a radio, a first directional antenna oriented at a first direction, a second directional antenna oriented at a second direction, an omnidirectional antenna, and a switch selectively coupled between the radio and the first directional antenna, the second directional antenna, and the omnidirectional antenna. A processor, coupled to the switch, may be configured to determine, based on an arbitration table, a first destination medium access control (MAC) address of a first client wireless device. The arbitration table may include, for each frame of the plurality of frames: (a) a frame identifier, (b) destination MAC address for the frame, (c) identifier of an antenna for transmitting the frame, and (d) identifier of an antenna for receiving acknowledgement data for the frame. The processor may further, based on the arbitration table, cause the switch to couple the radio to the first directional antenna and may transmit the first frame to the client wireless device via the first directional antenna. The first client wireless device may be located along the first direction with respect to the AP wireless device. The processor may further, based on the arbitration table, cause the switch to couple the radio to the omnidirectional antenna and receive a first acknowledgment, corresponding to the first frame, from the client wireless device via the omnidirectional antenna.

In further implementations, this selective control of the switch may be expanded to additional directional antennas to cover receipt of data from additional client wireless devices along antenna paths of strongest signal reception for each respective client wireless device, given the location of the client wireless device, as will be discussed in detail. After testing, the disclosed wireless AP device with the hybrid directional antenna system improves RF signal connectivity range by between twice and four times the distance compared to conventional home routers. Still greater connectivity range is contemplated via employment of the disclosed embodiments.

FIGS. 1A, 1B, 1C, 1D, and 1E are block diagrams of a hybrid directional antenna system 100 to enhance connectivity of a wireless device 102 to client wireless devices 101A and 102B according to various embodiments. The client wireless devices 101A and 102B are representative of additional client wireless devices that increasingly fill up homes and buildings, some of which move throughout the day. In various embodiments, the wireless device 102 is a wireless AP device that connects directly to a wired local area network (LAN) and provides wireless connections using wireless LAN technology, such as the Wi-Fi® technology, for other devices to use that wired connection. The wireless AP device may be an electronic device that implements a 2.4 GHz access point. The wireless AP device may be an electronic device that implements the 2.4 GHz access point and a 5 GHz access point integrated in the same device. Furthermore, the one or more wireless APs of the electronic device can be implemented by processing logic including hardware, software, firmware, or any combination thereof. It should also be noted that the electronic device may also include additional radios to one or more WLAN radios used to implement the one or more APs, such as wireless personal area network (WPAN) radios, wireless wide area network (WAN) radios, a global position system (GPS) device, and the like.

In various embodiments, the wireless device 102 includes multiple radios, e.g., a first radio 104A, a second radio 104B, a third radio 104C, and a fourth radio 104D, although more or fewer radios are envisioned in other embodiments coupled to an antenna matrix 114. As will be discussed in more detail with reference to FIGS. 1C, 2A, and 2B, the antenna matrix 114 may include at least one omnidirectional antenna, multiple directional antennas, and antenna switches. The wireless device 102 may further include memory 116 to store an arbitration table 117 among other data, one or more input/output devices 218, and a processor 120 (or other processing device). The arbitration table 117 may be representative of any data structure capable of storing antenna assignments on a per frame basis. The processor 120 can use the data structure to configure and re-configure the antenna matrix 114 to define a particular path to a particular antenna. As described herein, the antenna matrix 114 can be re-configured for transmission and receptions of data on a per-frame basis. These components may all be coupled to a communications bus 130. The processor 120 may further include an arbitrator 122 and a framework 124, each which may include processing logic that may comprise hardware (e.g., circuitry, dedicated logic, programmable logic, microcode, etc.), software (such as instructions running on the processor), firmware or a combination thereof. In some embodiments, one or more of the client wireless devices 101A and 101B may be built with the same or similar components as the wireless device 102.

The wireless device 102 may connect to a network 115 and communicate with a server 150, such as a cloud server or other computing device, accessible over the network 115. In various embodiments, the server 150 may include a processor 152 and a storage device. The storage device 160 may further include an arbitration map 162, historical signal information 164, and client device reports 168, which will be referred to in more detail. The network 115 may be representative of an Internet or WAN connection. Such an Internet or WAN connection may include additional links or trunks, whether wired or wireless, that may involve other types of wideband communication, including those based on cellular standard(s).

Figure 1B:
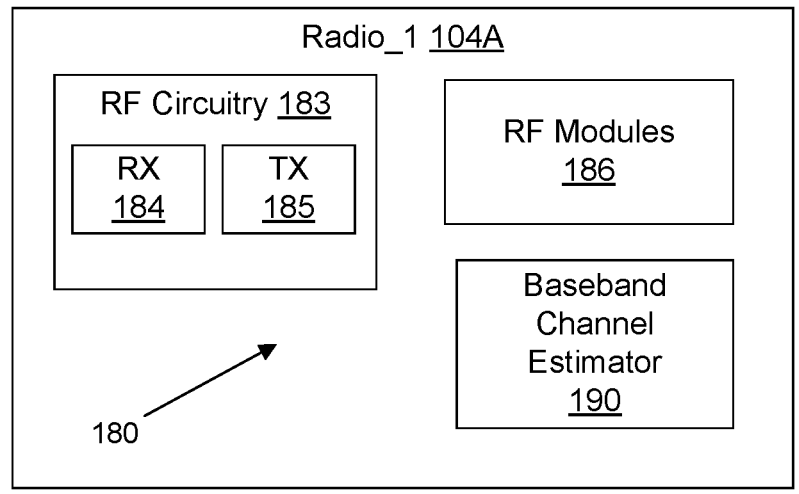

With additional reference to FIG. 1B, the first radio 104A, which is representative of each such radio of the wireless device 102, may include RF front end circuitry 180 such as RF circuitry 183, e.g., a receiver (RX) 184 and a transmitter (TX) 184, a set of RF modules 186, and a baseband channel estimator 190. In one embodiment, one of the RF modules 186 may include a Wi-Fi® physical layer (PHY) at which the RF energy of received RF signals may be measured for purposes of received signal strength information (RSSI), e.g., from the client wireless devices 101A and 101B, and PHY rate of data streaming. The baseband channel estimator 190, by virtue of being incorporated within the RF front end circuitry, may be coupled to the antenna matrix 114, the RX 184, and to the TX 185, and be adapted to estimate the channel state information (CSI) or the RSSI for each channel. The CSI may include a detailed channel impulse response with both amplitude and phase information across all the Orthogonal Frequency Division Multiplexing (OFDM) subcarriers and be updated (at the maximum rate) every OFDM symbol. The CSI data may therefore be analyzed to passively determine signal strength from the client wireless device 101A and 101B.

Figure 1C:
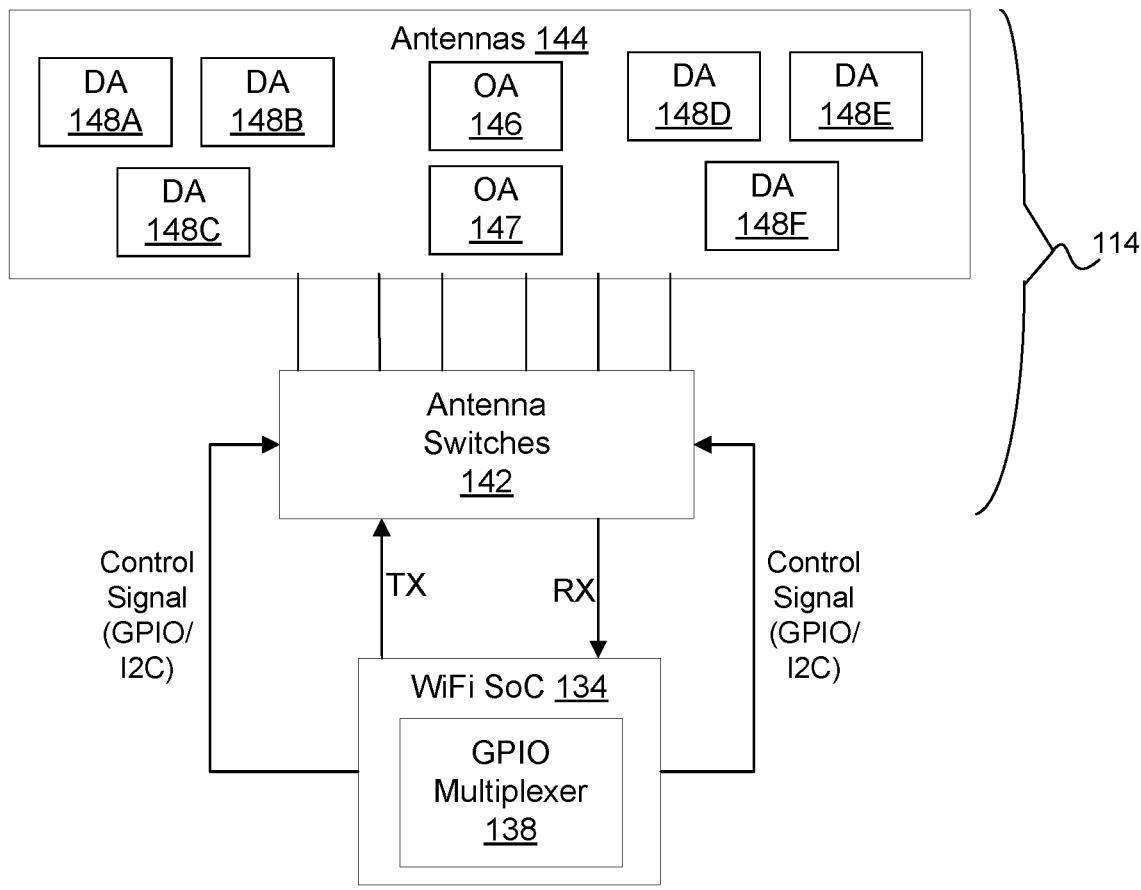

With additional reference to FIG. 1C, the antenna matrix 114 may include multiple antennas 144 and antenna switches 142, according to an embodiment. The antennas 144 may include a first omnidirectional antenna 146, a second omnidirectional antenna 147 (and optionally additional omnidirectional antennas), a first directional antenna 148A, a second directional antenna 148B, a third directional antenna 148C, a fourth directional antenna 148D, a fifth directional antenna 148E, and a sixth directional antenna 148F, and optionally additional directional antennas. The antennas 144 can direct high gain signals to multiple client wireless devices to achieve high downlink throughput without sacrificing uplink signal reception. To do so, each of the antennas 144 may be selectively coupled, via the antenna switches 142, to a radio to either transmit or receive data, or to both transmit and receive data, during any given frame of multiple frames of streaming data. Each of the antenna switches 142 may be a single switch between a radio (e.g., one of the radios 104A, 104B, 104C, or 104D) and all of the antennas 144. As a number of the antennas 144 grows, some of the antenna switches 142 may need to be cascaded as per FIG. 1E to selectively couple each of the radios to many antennas that are selectively coupled to a cascaded series of switches.

In one embodiment, the wireless device 102 includes an integrated system-on-a-chip (e.g., a Wi-Fi® SoC) 134, which includes the radios 104A, 104B, 104C, and 104D, transmit (TX) and receive (RX) channels, and a general purpose input/output (GPIO) multiplexer 138. In one embodiment, at least some of the antenna switches 142 are also integrated within the Wi-Fi® SoC, and additional of the antenna switches 142 may be located off-chip of the Wi-Fi® SoC 134 to provide additional switching capability.

Figure 1D:
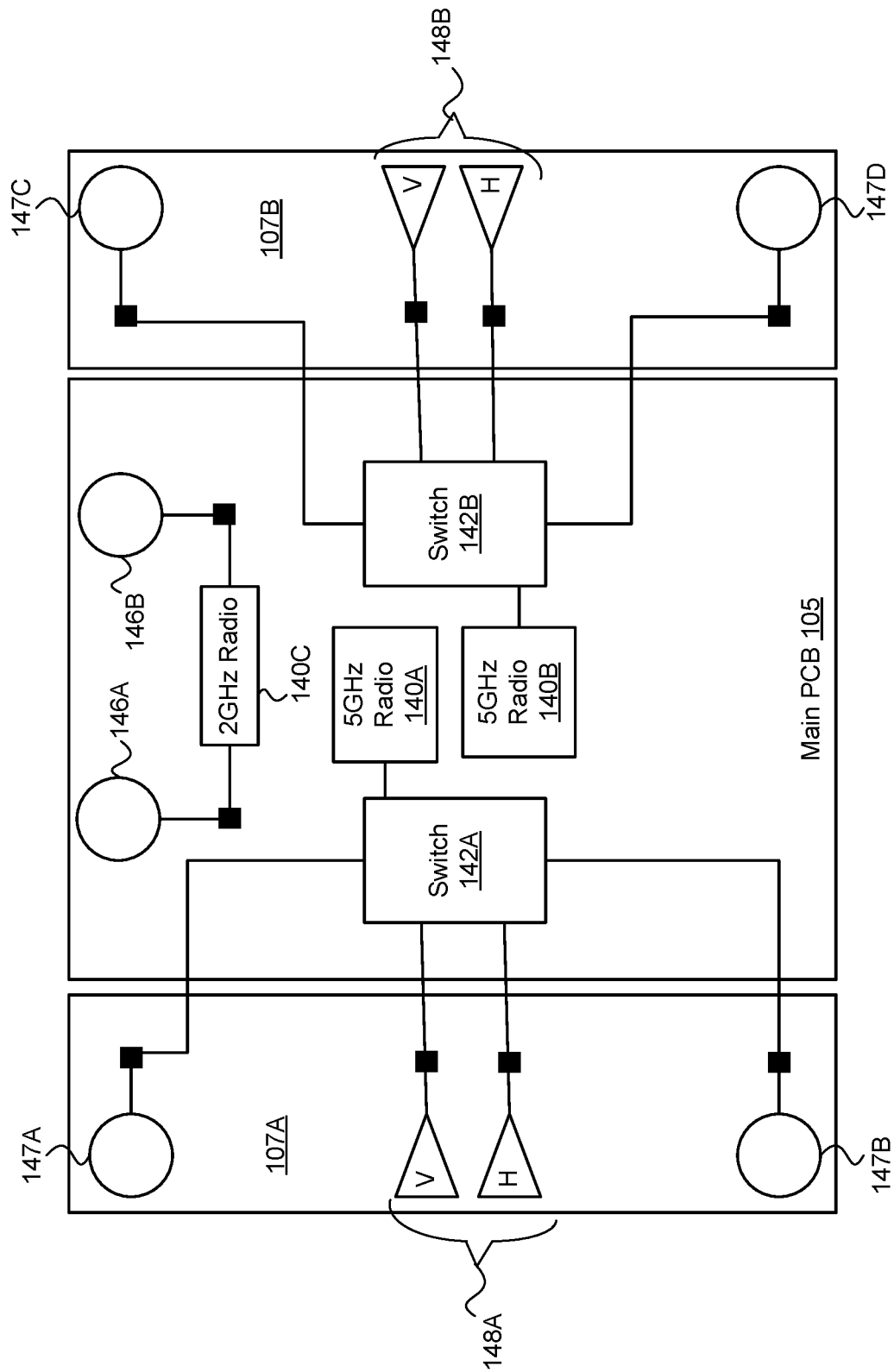

FIG. 1D is a block diagram of a main printed circuit board (PCB) 105, a first antenna board PCB 107A, and a second antenna board PCB 107B illustrative of an embodiment of an antenna layout of the hybrid directional antenna system 100. The main PCB 105 may include a first 5 GHz radio 140A, a first switch 142A, a second 5 GHz radio 140B, a second switch 142B, a 2 GHz radio 140C, and a pair of omnidirectional antennas 146A and 146B coupled to the 2 GHz radio 140C. In one embodiment, the first 5 GHz radio 140A is the first radio 104A and the second 5 GHz radio 140B is the second radio 104B.

The first antenna board PCB 107A may include a first omnidirectional antenna 147A, a second omnidirectional antenna 147B, a first pair of directional antennas 148A (e.g., one of vertical polarization and another of horizontal polarization), each selectively coupled to the first 5 GHz radio via the first switches 142A. In one embodiment, the switch 142A may selectively switch coupling between the first and second omnidirectional antennas 147A and 147B and the first pair of directional antennas 148A.

The second antenna board PCB 107B may include a third omnidirectional antenna 147C, a fourth omnidirectional antenna 147D, and a second pair of directional antennas 148B (e.g., one of vertical polarization and another horizontal polarization), each selectively coupled to the second 5 GHz radio 140B via the second switches 142B. In one embodiment, the switch 142B may selectively switch coupling between the third and fourth omnidirectional antennas 147C and 147D and the second pair of directional antennas 148B.

Figure 1E:
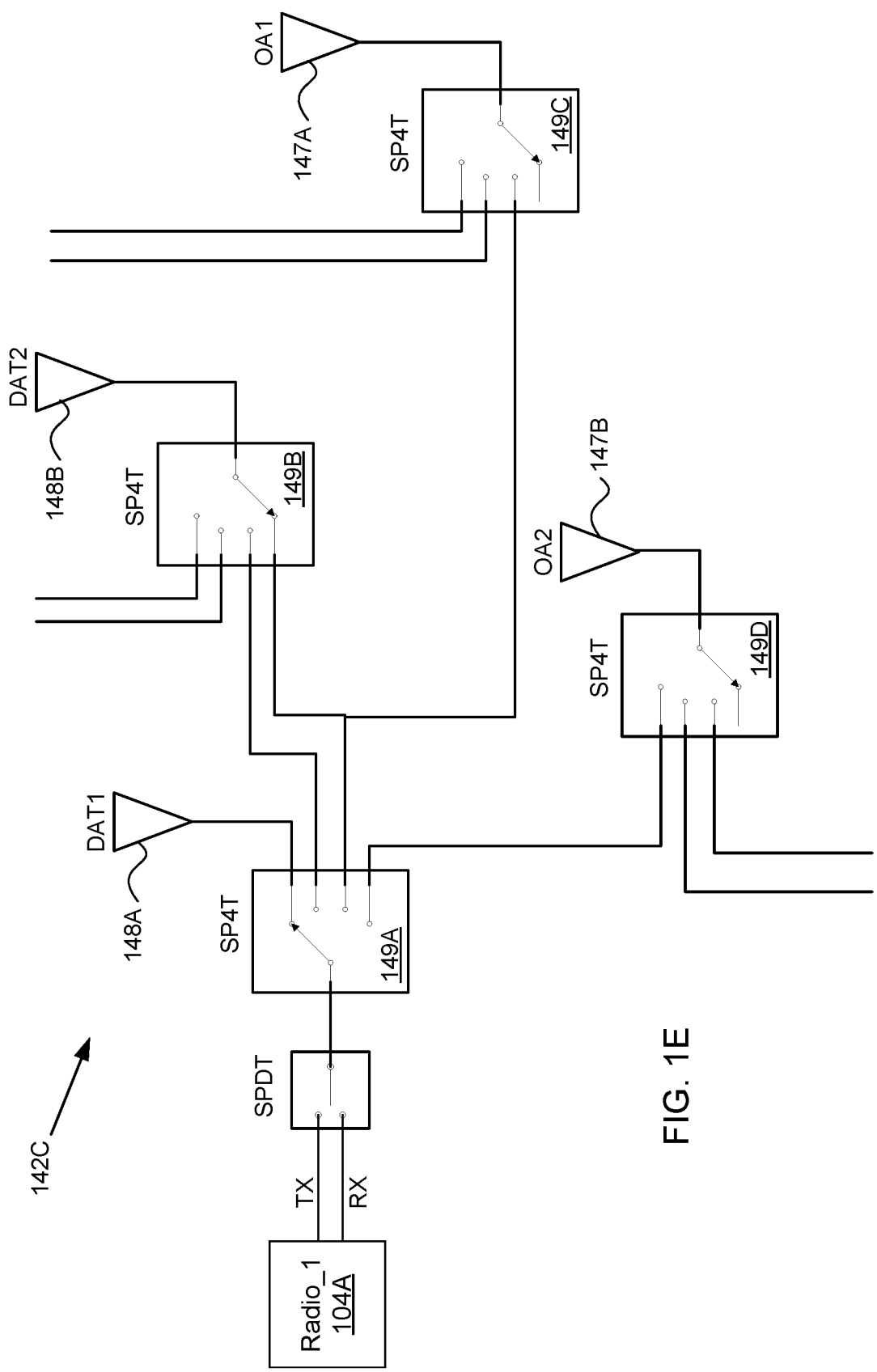

FIG. 1E is a block diagram of a cascaded series of switches 142C illustrative of implementation of antenna switching within the antenna matrix 114 of the hybrid directional antenna system 100 according to an embodiment. The cascaded series of switches 142C may begin with a single pole, double throw (SPDT) switch to the radio 104A (or other radio disclosed herein) to multiplex between transmission (TX) and reception (RX) of data. The cascaded series of switches may further include a set of single pole, quadruple throw (SP4T) switches. For example, the SPDT switch may be coupled to a first SP4T switch 149A, which is in turn coupled to the first pair of directional antennas 148A, to a second SP4T switch 149B, to a third SP4T switch 149C, and to a fourth SP4T switch 149D. The third SP4T switch 149B may then be coupled to the second pair of directional antennas 148B, to the third SP4T switch, and to additional radios or SP4T switches (not shown). The third SP4T switch 149C may be further coupled to the first omnidirectional antenna 147A and perhaps to other radios or further SP4T switches (not shown). The fourth SP4T switch 149D may be further coupled to the second omnidirectional antenna 147B and perhaps to other radios or further SP4T switches (not shown) according to various embodiments. Accordingly, to selectively couple the radio 104A to one of the antennas, control signals may be sent to the cascaded series of switches 142C to close an antenna path that will activate one or more of the antennas 144 at any given time. When "a switch" is referred to below, therefore, it is to be understood that the switch may a cascaded series of switches that are simultaneously controlled to connect an antenna path to a particular radio.

Figure 2B:
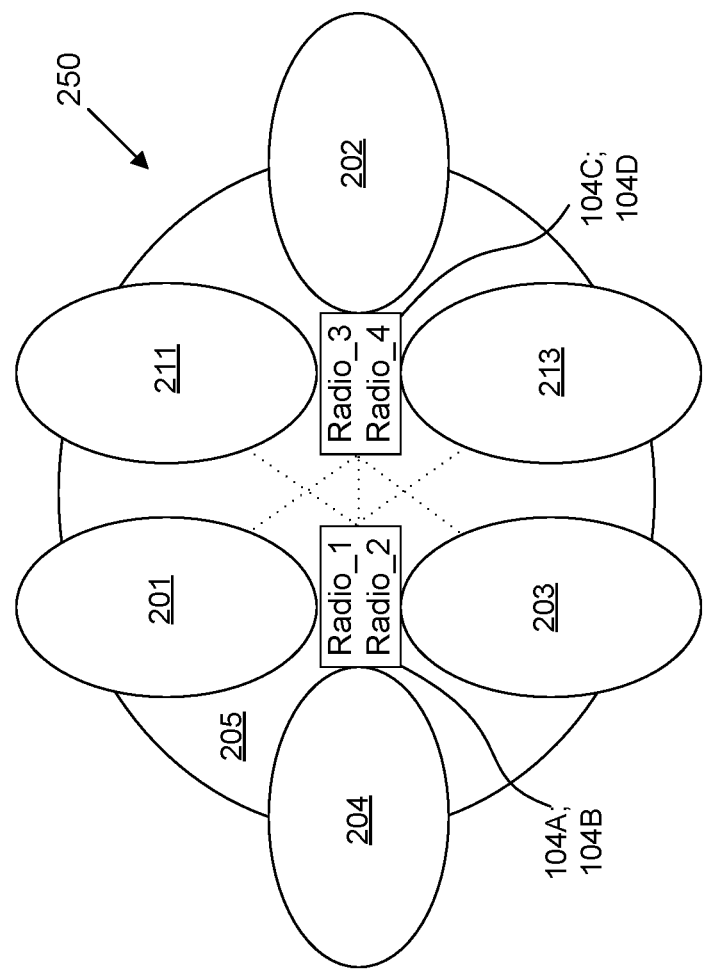
FIG. 2B is a wireless signal diagram illustrating radiation patterns associated with a multiple-radio antenna matrix according to an embodiment.
Figure 2A:
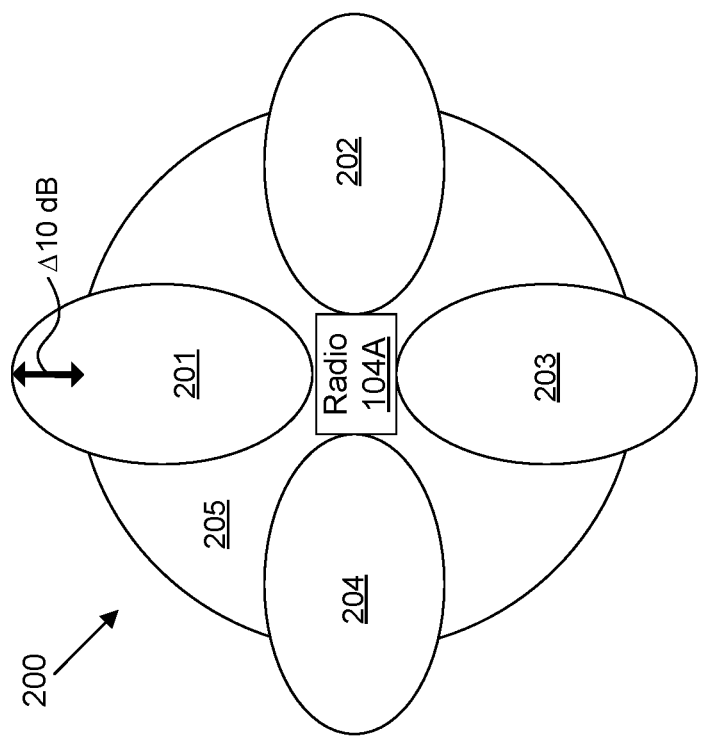
FIG. 2A is a wireless signal diagram illustrating radiation patterns associated with a single-radio antenna matrix according to an embodiment.

FIG. 2A is a wireless signal diagram illustrating radiation patterns associated with a single radio antenna matrix 200 according to an embodiment. The single radio may be the first radio 104A (or other radio like the first 5 GHz radio 140A) for purposes of explanation where the single radio antenna matrix 200 may represent the antenna matrix 114 (FIGS. 1A and 1C). The single radio antenna matrix 200 may include the first directional antenna 148A, the second directional antenna 148B, a third directional antenna 148C, a fourth directional antenna 148D, and a first omnidirectional antenna 146, which generate a radiation pattern 201 of electromagnetic energy, a second radiation pattern 202, a third radiation pattern 203, a fourth radiation pattern 204, and an omnidirectional radiation pattern 205, respectively. Each directional antenna may be able to transmit with a 10 dB increase in RF energy compared to the omnidirectional antenna, and be directed in one of four directions in the present embodiment, as illustrated by the radiation patterns.

In one embodiment, the first antenna 148A may radiate electromagnetic energy in a first direction, the second directional antenna 148B may radiate electromagnetic energy in a second direction, the third directional antenna 148C may radiate electromagnetic energy in a third direction, and a fourth directional antenna 148D may radiate electromagnetic energy in a fourth direction. The radio may transmit over any of the directional antennas or the omnidirectional antenna and may receive over any of the directional antennas or the omnidirectional antenna.

FIG. 2B is a wireless signal diagram illustrating radiation patterns associated with a multiple radio antenna matrix 250 according to one embodiment. The multiple radios may include the first radio 104A, the second radio 104B, the third radio 104C, and the fourth radio 104D, which may be coupled to each other and where the multiple radio antenna matrix 250 may represent the antenna matrix 114 (FIGS. 1A and 1C). In various embodiments, the multiple radio antenna matrix 250 may include the omnidirectional antenna 146, the first directional antenna 148A oriented in the first direction, the second directional antenna 148B oriented in the second direction, the third directional antenna 148C oriented in the third direction, the fourth directional antenna 148D oriented in the fourth direction, a fifth directional antenna 148E oriented in one of the first direction or a fifth direction, and a sixth directional antenna 148F oriented in one of the third direction or a sixth direction. The fifth and sixth directions may, therefore, be different than the first, second, third, and fourth directions. These antennas may generate an omnidirectional radiation pattern 205, a first radiation pattern 201, a second radiation pattern 202, a third radiation pattern 203, a fourth radiation pattern 204, a fifth radiation pattern 211, a sixth radiation pattern 213, respectively.

As the multiple radio antenna matrix 250 is coupled to four different radios, the wireless device 102 may selectively control one switch or a series of cascaded switches of the antenna switches 142 to dynamically select a different antenna path and co-transmit in both the phase and frequency domain. For example, the first radio 104A may transmit on the first directional antenna 148A while the second radio 104B transmits on the fourth directional antenna 148D at the same frequency. Further by way of example, the third radio 104C may transmit on the second directional antenna 148B while the fourth radio 104D transmits on the third directional antenna 148C at a different, or second, frequency.

In some embodiments, the antenna path routing may be selected by the switches 142 controlled by hardware level GPIOs, e.g., within the GPIO multiplexer 138. This allows per-frame arbitration on both transmit and receive directions. For example, the first radio 104A may transmit frame A to station A on the first directional antenna 148A and transmit frame B to station B on one of the second directional antenna 148B, the third directional antenna 148C, or the fourth directional antenna 148D.

With continued reference to FIG. 1A, the arbitration table 117 may be a lookup table (or other data structure or object) that maps each destination medium access control (MAC) address with its optimal antenna transmission path. Table 1 below is an example of arbitration table 117. As illustrated in Table 1, the arbitration table 117 may include metadata associated with each frame of a series of frames of a data stream to be transmitted to one or more of the client wireless devices. For example, each entry in the table may specify a particular frame of the data stream, e.g., Frame 1 as illustrated in Table 1 below. For every frame, the table may further specify a destination MAC address for that frame and the specific antenna to be used for transmission of that frame and receiving the acknowledgement for receipt of that frame by a client device. For example, referring to Table 1 below, for the first frame (i.e. Frame 1) the table specifies a destination MAC address (i.e. 15-68-EE-EF-FD-35) of a client device and a specific antenna (i.e. Antenna 1) to be used for transmitting Frame 1. In addition, the table also specifies the antenna (i.e. Antenna 5) to be used for receiving the acknowledgement message from the client device once the client device receives Frame 1. Referring back to FIG. 1E, Antenna 1 or Antenna 5 can be any of antennas 148 or 147 and may include directional or omnidirectional antennas. The subsequent frames listed in entries of the arbitration table 117 may further be transmitted and acknowledgements received in like manner, with Antenna 2 and Antenna 3 also including any directional or omnidirectional antenna.

TABLE 1

| Frame Number | Client Device MAC address | Antenna Information |
| --- | --- | --- |
| Frame 1 | 15-68-EE-EF-FD-35 | Tx = Antenna 1 |
|  |  | Rx = Antenna 5 |
| Frame 2 | A1-35-4B-28-A5-1F | Tx = Antenna 2 |
|  |  | Rx = Antenna 5 |
| Frame 3 | DB-85-5B-D8-8B-BE | Tx = Antenna 3 |
|  |  | Rx = Antenna 5 |

In embodiments, each radio may lock the antenna switch (of one the first and second sets of antenna switches 142A and 142B) just before frame transmission and release the lock after the last bit is transmitted, e.g., after completion of transmission of the frame. As the Wi-Fi® protocol is half-duplex, locking may be performed via message exchange of the Wi-Fi® SoC 134 to internal switching logic of the Wi-Fi® SoC. Accordingly, an antenna switch of the Wi-Fi® SoC may be automatically locked during transmission of the frame. Alternatively, when controlling antenna switches external to the Wi-Fi® SoC 134 (such as the antenna switches 142 illustrated in FIG. 1C), the Wi-Fi® SoC 134 may send hardware control signals to the antenna switches 142 to lock the antenna switches during transmission of the frame, e.g., via GPIO signals or inter-integrated circuit (I2C) signals.

In additional or alternative embodiments, a further mechanism to ensure that antenna usage is de-conflicted is for the arbitrator 122 to schedule transmission, via the arbitration table 117, of respective frames of multiple frames of a data stream (e.g., quality-of-service (QoS) traffic types) according to a combination of an antenna path of strongest signal reception with a client wireless device and of a frame priority. The frame priority may include a combination of a MAC address priority and an application priority. For example, Table 2 illustrates an example of per-frame priority according to the MAC address and application priorities. In additional or alternative embodiments, the arbitrator 122 may further apply a hierarchical set of rules to set different kinds or additional priorities or weights to the assignment of antenna paths to various frames of multiple frames contained in a data stream.

TABLE 2

| Traffic Type | MAC Priority | Application Priority |
| --- | --- | --- |
| Background | 0 | 0 |
| Best Effort | 1 | 0 |
| Video | 2 | 0 |
| Voice | 3 | 0 |
| Proprietary Video | 2 | 2 |

In one embodiment, the wireless device 102 includes the first radio 104 selectively coupled to, via a first switch, the first directional antenna 201, the second directional antenna 202, and the omnidirectional antenna 205. The wireless device 102 may further include the second radio selectively coupled to, via a second switch, the third directional antenna 203, the fourth directional antenna 204, and the omnidirectional antenna. The memory 116 (FIG. 1A) may store the arbitration table 117 associated with a data stream that includes multiple frames.

In the present embodiment, the processor 120 is coupled to the first switch, to the second switch, and to the memory, wherein to program the arbitration table, the processor is to store a first frame of the multiple frames in a transmission queue (e.g., a hardware queue in the memory 116 that orders the frames of data streaming from the wireless device 102), and program a first entry in the arbitration table. The first entry may include an identifier of the first frame, a destination medium access control (MAC) address of a first client wireless device, an identifier of the first directional antenna, and an identifier of the omnidirectional antenna. A signal received from the first client wireless device by the first directional antenna may be stronger than signals received from the first client wireless device by any of the second, third, or fourth directional antennas. For this reason, the first directional antenna may be identified to be the transmit antenna for data frames going to the destination MAC address of the first client wireless device.

To continuing programming the arbitration table, 117, the processor 120 may further store a second frame of the plurality of frames in the transmission queue and program a second entry in the arbitration table. The second entry may include an identifier of the second frame, a destination MAC address of a second client wireless device, and an identifier of the third directional antenna. A signal received from the second client wireless device by the third directional antenna may be stronger than signals received from the second wireless device by any of the first, second, or fourth directional antennas. For this reason, the third directional antenna may be identified to be the transmit antenna for data frames going to the destination MAC address of the second wireless device.

According to the present embodiment, the processor 120, to transmit the multiple frames, retrieves the first entry for the first frame from the arbitration table, causes the first switch to couple the radio to the first directional antenna, and transmits the first frame to the first client wireless device 101A via the first directional antenna. The first client wireless device 101A may be located along a first direction with respect to the AP wireless device 102. The processor 120 can cause the second switch to couple the radio to the omnidirectional antenna and receive a first acknowledgment, corresponding to the first frame, from the client wireless device 101A via the omnidirectional antenna.

Further to the present embodiment, the processor 120 retrieves the second entry for the second frame from the arbitration table, causes the second switch to couple the second radio to the third directional antenna, and transmits the second frame to the second client wireless device 101B via the third directional antenna. The second client wireless device 101B may be located along a third direction (or some other direction) with respect to the AP wireless device 102. The processor 120 may receive a second acknowledgment, corresponding to the second frame, from the second client wireless device 101B via the third directional antenna.

In a further embodiment, the first radio transmits data via the first directional antenna at a first frequency, and the second radio concurrently transmits data via the third directional antenna at one of the first frequency or a second frequency different than the first frequency. Further, to be able to direct the hardware of the antenna matrix 114, the processor 120 may add first metadata to the first frame in the transmission queue to selectively control the first switch. The first metadata, for example, may include the destination MAC address of the first client wireless device, the identifier of the first directional antenna, and the identifier of the omnidirectional antenna. The processor 120 may further add second metadata to the second frame in the queue to selectively control the second switch. The second metadata may include the destination MAC address of the second client wireless device and the identifier of the third directional antenna. In another embodiment, the transmission queue is a hardware or software buffer associated with data transmission.

With continued reference to FIG. 1A, the arbitrator 122 may be responsible for selecting the best antenna path for each destination MAC address, e.g., an antenna path of strongest signal transmission to and reception from a client wireless device that owns that destination MAC address. If the best antenna path is in use or is preempted by a frame of higher frame priority, the arbitrator may delay transmission or select an alternative antenna path, which may be a next best antenna path. The arbitrator 122 may store a map between destination MAC addresses and historical signal information for each of the antenna paths. In one embodiment, the framework 124 may program the arbitrator map 162, which may further be stored or updated on the server 150.

The arbitrator 122 may also be responsible for reporting location data and the signal quality information, such as at least one of RSSI, CSI, or PHY rate, to the framework 124 as the signal strength information of the client wireless devices 101A and 101B changes. The arbitrator 122 may also provide mechanisms by which the framework 124 may schedule probe events to actively or passively sense the signal quality of client wireless devices across different antenna configurations, and update such information on the server 150.

Figure 3A:
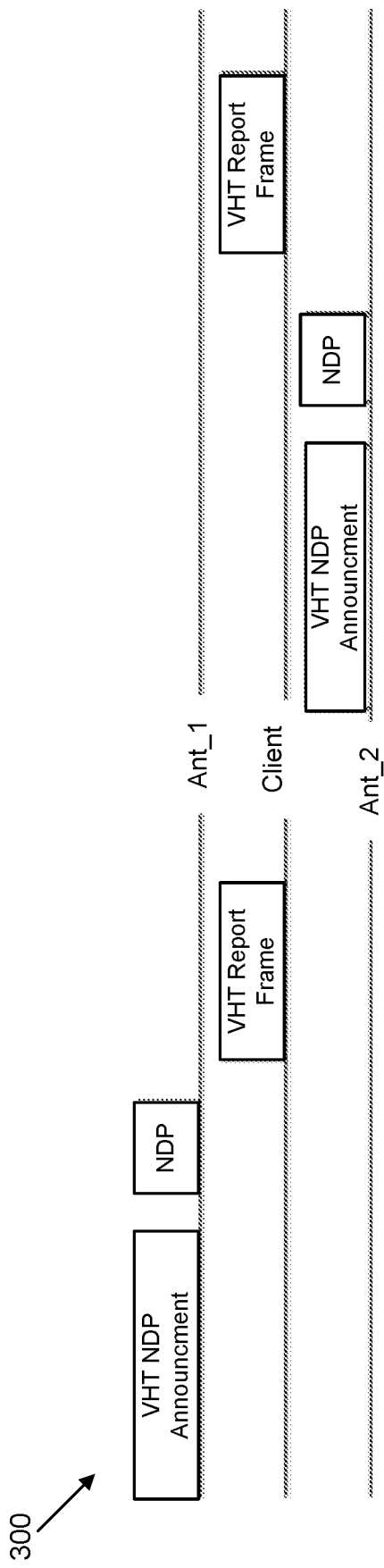
FIG. 3A is a signal diagram of active probing by multiple directional antennas according to an embodiment.

FIG. 3A is a signal diagram 300 of active probing by multiple directional antennas according to an embodiment. The active probing may be performed by periodically scheduling sounding packets on each antenna path and processing the RSSI field from the response of the sounding packets. For example, the wireless device 102 may transmit, on such a periodic schedule, a very high throughput (VHT) null data packet (NDP) announcement followed by the NDP on the first directional antenna 148A. The client wireless device 101A at which the NDP sounding packet was directed may respond with signal strength information (such as a VHT report frame that may include the RSSI field and phase information) associated with the NDP sounding packet. As illustrated, this active probing may continue across the directional antennas, e.g., moving next to the second directional antenna 148B. As the same client wireless device responds to an active probing by two different directional antennas at different times, the arbitrator 122 may conclude that the client wireless device is moving with reference to the wireless AP device, e.g., the wireless device 102. This information may further lead the arbitrator programming upcoming frames in the arbitration table 117 to the destination MAC address of the client wireless device to transmit on the second directional antenna 148B, the last known direction of the client wireless device, or some other antenna other than a previously employed antenna.

According to additional embodiments, the processor 120 is further to selectively control the switches 142 to periodically transmit probing radio frequency (RF) signals from the radio 104A over the first directional antenna 148A, over the second directional antenna 148B, and over the third directional antenna 148C (among over other antennas). The processor 120 may further periodically receive from the client wireless device 101A, in response to the probing RF signals, at least one of: a first signal strength value via the first directional antenna, a second signal strength value via the second directional antenna, and a third signal strength value via the third directional antenna. The processor 120 may transmit, based on the second signal strength information, a subsequent frame of the plurality of frames to the client wireless device via the second directional antenna, where the client wireless device 101A has moved to be located along a second direction with respect to the wireless device 102 (e.g., the second direction along which is oriented the second directional antenna).

In another embodiment, the processor 120 determines that the third signal strength value is greater than the first and the second signal strength values. The processor 120 may further transmit a subsequent frame of the plurality of frames to the client wireless device 101A via the third directional antenna, e.g., where the client wireless device 101A has moved from being located along the first direction to being located along the third direction.

Figure 3B:
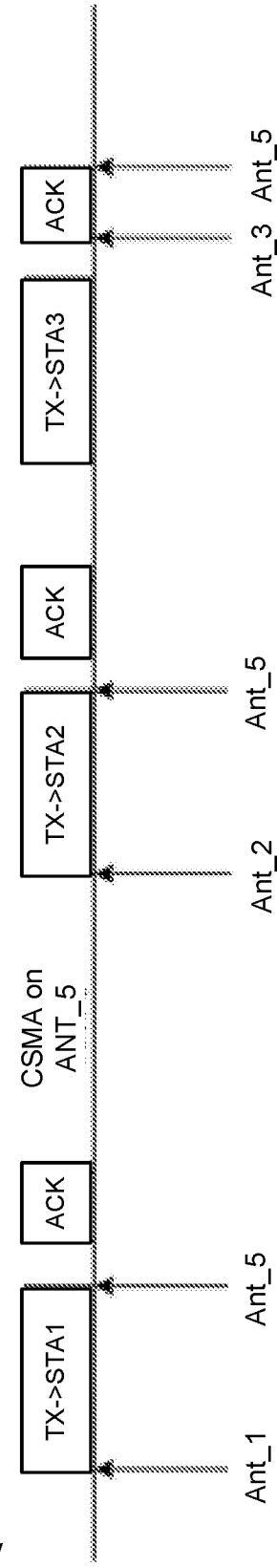
FIG. 3B is a signal diagram of passive probing by a combination of directional and omnidirectional antennas according to an embodiment.

FIG. 3B is a signal diagram 350 of passive probing by a combination of directional and omnidirectional antennas according to an embodiment. In some embodiments, a null frame may be used for legacy devices that do not support beamforming sounding. Passive probing may therefore be performed by extracting CSI data from packets exchanged between the wireless device 102 and connected client wireless devices and by monitoring acknowledgements (acks) and signal strength (or signal quality) of received packets exchanged between the wireless device 102 and the client wireless devices 101A and 101B. The arbitrator 122 may further utilize the inter-frame spacing between each 802.11 frames to switch the antenna path.

Accordingly, with reference to diagram 350 of FIG. 3B, the arbitrator 122 may control the switches 142 to transmit to station one over the first directional antenna 201 and receipt of an acknowledgement over the omnidirectional antenna 146. In the inter-frame spacing between the 802.11 frames, the wireless device 102 may perform carrier sense multiple access (CSMA) over the omnidirectional antenna 146 to listen for, or sense, network signals containing the CSI packets. This process may then be repeated, as scheduled, over the second directional antenna 148B, the third directional antenna 148C, and so forth, as illustrated.

According to additional embodiments, the baseband channel estimator 190 is coupled to the processor 120 and to the radio 104A. The baseband channel estimator 190 may detect receipt, via the radio between frame transmissions, of data including channel properties (e.g., CSI) that represent wireless signal propagation characteristics of wireless signals received from the first client wireless device 101A. The arbitrator 122 may further be configured to determine, from the data, acknowledgements from and received signal quality information (such as RSSI or other signal strength information). The arbitrator 122 may further change the identifier for at least one of the transmit antenna or the receive antenna in the arbitration table for frames associated with the first MAC address in view of the received signal quality information detected with the data. As a result, the wireless AP device may transmit, based on the received signal quality information, a subsequent frame of the plurality of frames to the first client wireless device 101A via one of the second directional antenna, the third directional antenna, or the omnidirectional antenna.

In one embodiment, and with addition reference to FIGS. 1C-1E and Table 1, the channels of the wireless device 102 are coupled to the SPDT switch to switch between transmission (TX) and reception (RX) of data packets. If control of the switches is performed internally to the Wi-Fi SoC 134, the switching information (e.g., which radio to couple to which antenna as per the arbitration table 117) may be supplied directly with the frames, e.g., via metadata added to each respective frame, as the data are being streamed from the wireless device 102. For example, the arbitrator 122 may add an antenna assignment mask to each frame queued to the antenna matrix hardware so that the antenna matrix hardware (e.g., antenna switches) knows which antenna (e.g., which transmit antenna and which receive antenna) to use for each frame. In one embodiment, to queue the first frame for transmission (Table 1), the arbitrator 122 may add metadata that includes the first destination MAC address, the identifier of the first directional antenna 201, and the identifier of the omnidirectional antenna 205 to the first frame within the queue of the data stream.

In additional embodiments, if the control of the switches is performed externally, the switching may be performed via toggling GPIOs of the GPIO multiplexer 138 to select the antenna, e.g., a transmit antenna for transmission followed by a receive antenna for reception. In one embodiment and with further reference to Table 1, the arbitrator 122 may set the GPIO multiplexer 138 to signal the switch to select the first directional antenna 201 (as the transmit antenna) to which is coupled the radio 104A, to transmit the first frame to the first client wireless device 101A. The arbitrator 122 may further set the GPIO multiplexer 138 to signal the switch to select the omnidirectional antenna 146 (as the receive antenna) via which to receive the first acknowledgement from the first client wireless device 101A.

In various embodiments, the framework 124 may be responsible for assigning and reassigning the antenna path for each of the connected client wireless devices based on criteria data such as at least one of bandwidth requirements (e.g., standard definition (SD), high-dentition (HD) video, live streaming), traffic patterns (e.g., historical movements of the client wireless devices through various identified locations), supported modes (11a versus 11n versus 11ac protocols), or application level priority assignments (as per Table 2) of the different client wireless devices. The framework 124 may track the signal quality for each client wireless device and inform the arbitrator 122 of changes in the antenna assignments, so that the arbitrator 122 may program those antenna assignments within the arbitration table 117. Once updated, the wireless AP device 102 may transmit a subsequent frame to a client wireless device via a different transmit antenna and optionally receive an acknowledgment via a different receive antenna.

Figure 4A:
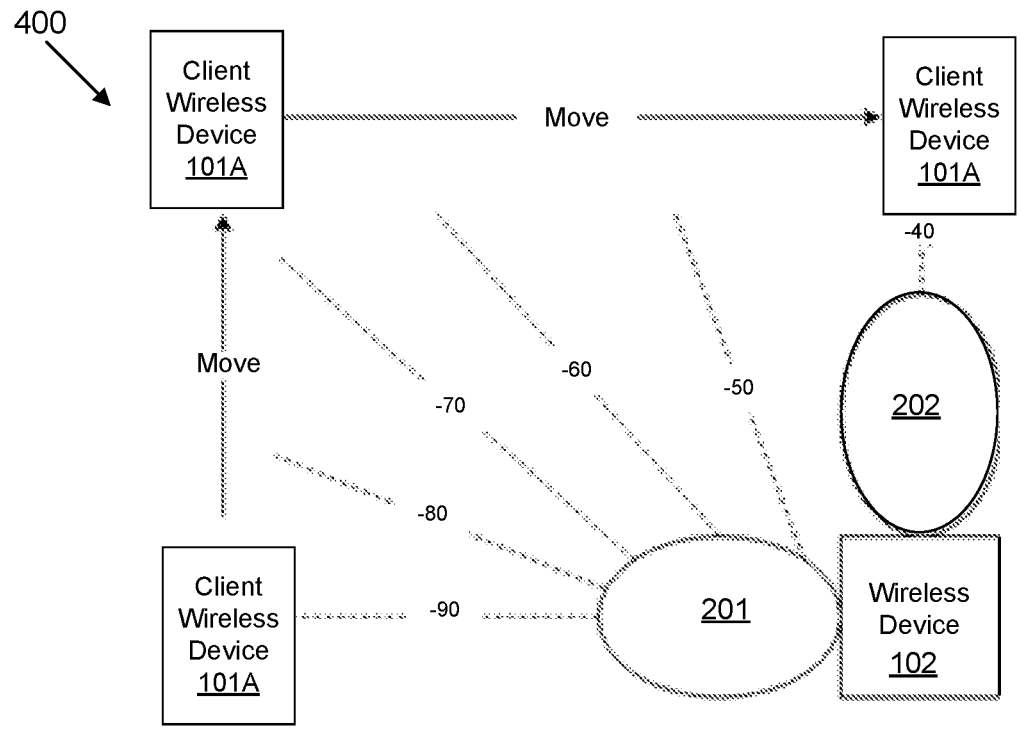
FIG. 4A is a diagram of the hybrid directional antenna system tracking movement of a client wireless device according to an embodiment.

FIG. 4A is a diagram 400 of the hybrid directional antenna system 100 tracking movement of the client wireless device 101A according to an embodiment. In the embodiment of FIG. 4A, a user that may be carrying the client wireless device 101A may move from being within a first radiation pattern of the first directional antenna 201 at a 90-degree angle, to being within the first radiation pattern at a different angle, such as a 60-degree angle, to being outside of the first radiation pattern. When outside of the first radiation pattern, the client wireless device 101A may have moved to within a second radiation pattern of the second directional antenna 202. In embodiments, based on criteria data discussed above detected with reference to the client wireless device 101A as the user moves, the framework 124 may direct the arbitrator 122 to change the antenna assignment from the first directional antenna 201 to the second directional antenna 202 in the arbitration table 117 for the first destination MAC address associated with the first client wireless device 101A.

The framework 124 may publish, to the server 150, the arbitration map 162, e.g., which maps or correlates signal strength of certain antennas to particular locations within a home or building, and which may take into consideration bandwidth usage pattern of the client wireless devices. In one embodiment, the server 150 and/or the framework 124 may determine idle conditions, schedule the periodic active probes, and reassign antenna path weights for each of the client wireless devices 101A and 101B. The antenna path weights may in turn be integrated within calculations to reassign particular antennas with which to transmit data to and/or receive data from the client wireless device 101A or 101B. The framework 124 may also monitor the PHY rate of the connected client wireless devices 101A and 101B to determine the optimal antenna (e.g., the antenna over which the strongest wireless signal is received) on which to transmit for each of the client wireless devices 101A and 101B.

Figure 4B:
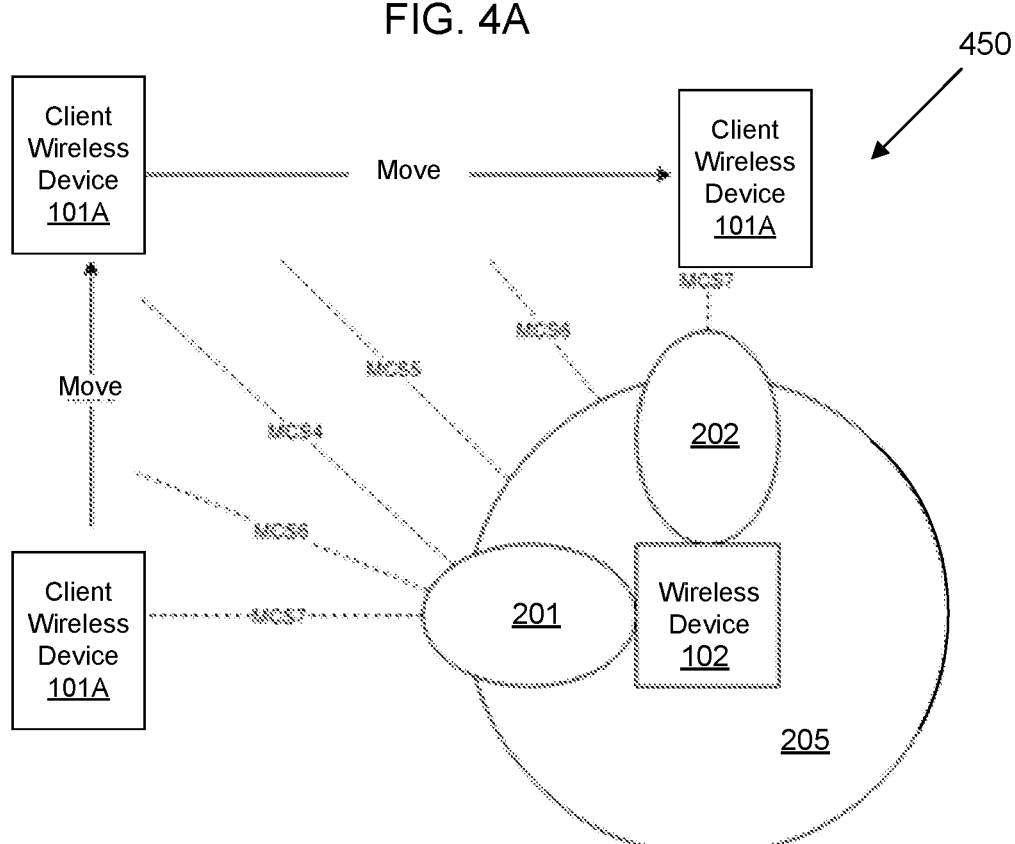
FIG. 4B is a diagram of the hybrid directional antenna system tracking movement of a client wireless device according to another embodiment.

FIG. 4B is a diagram 450 of the hybrid directional antenna system 100 tracking movement of a client wireless device according to another embodiment. In this embodiment, the framework 124 may direct the arbitrator 122 in antenna assignments that interleave between assignment to the first directional antenna 201 and assignment to the omnidirectional antenna 205. As the user travels with the client wireless device 101A through various modulation and coding scheme (MCS) angles, the framework 124 may transfer assignment of the transmit antenna from the first directional antenna 201 to the omnidirectional antenna 205. In the middle space between the first and second directional antennas 201 and 202, the omnidirectional antenna 205 may receive a stronger signal even if for limited angles with respect to the directional antennas.

FIG. 5A is a diagram 500 of the hybrid directional antenna system 100 actively probing third party client wireless devices according to an embodiment. As discussed previously, such active probing may be performed by sending out, via directional antennas, sounding packets (e.g., probing RF signals) and receiving signal strength information such as CSI and/or RSSI data in return acknowledgements (Ack). The signal strength information may be detected with reference to identified directional antennas and processed to determine the directional antenna receiving the strongest CSI or RSSI, for example. If the client wireless device moves, the strongest signal strength information may be received over a different directional antenna, and so transmission to and reception from the client wireless device may be changed to the different directional antenna.

FIG. 5B is a diagram 550 of the hybrid directional antenna system 100 receiving signal quality reports from proprietary client wireless devices according to an embodiment. "Proprietary" may indicate technology developed for integration within a proprietary system platform shared in common with the wireless device 102. A proprietary client device may be a wireless end-node device, such as a phone, a tablet, an entertainment device (e.g., FireTv, FireTv Cube), or the like that wirelessly communicates to share proprietary technology developed for and integrated within a platform shared in common with the wireless device 102. In some cases, the client device is considered proprietary when it implements technology that permits the client device to report data back to the wireless device 102, to the cloud, or both. In this situation, the proprietary client wireless devices may detect data packets (e.g., frames) from the wireless device 102 and automatically send reports back to the wireless device 102. In one embodiment, the proprietary client wireless device may execute firmware to actively determine RSSI, PHY rate, and CSI data, and transmit this data in reports back to the wireless device 102 as bi-directional feedback and for which the wireless device 102 may forgo any active or passive probing. The proprietary client wireless device may also send location data (e.g., GPS, accelerator, and gyroscopic data) to the wireless device 102. In this way, the latency is cut in half, significantly shortening the "probing phase," and bandwidth may be increased in only needing to receive the reports from the proprietary client wireless devices. This data that is sent in reports may be processed into additional input(s) used by the wireless device 102 to determine which type of antenna and which antenna to use next for a particular proprietary client wireless device.

FIG. 6 is a diagram 600 of detection of a strong hidden node 603 in communicating with a proprietary client wireless device according to an embodiment. The strong hidden node 603 may be hidden in the sense that it is outside of the network to which the wireless AP device 102 is connected. The strong hidden node 603 may be, for example, another wireless AP device in a nearby home, building, or other structure. The proprietary client wireless device may detect that the strong hidden node 603 is interfering with receiving a transmission from the wireless device 102 e.g., via higher than usual packet error rate or the like. The high power transmission from the hidden node 603 causes interference in a way that can be measured by a packet error rate higher than a first threshold error rate, and thus be termed a "strong" hidden node. In contrast, a node may be considered "weak" when the interference is measured to be less than a second threshold error rate that is lower than the first error threshold rate. In the presence of the strong hidden node 603, the proprietary client wireless device may then direct the wireless device 102 to switch from a directional antenna to an omnidirectional antenna to bypass the strong hidden node 603 and get the transmission through to the proprietary client wireless device. Making a switch to the omnidirectional antenna may bypass interference previously caused by the strong hidden node when using the directional antenna. Transmissions using the omnidirectional antenna can generate a wider electromagnetic radiation pattern and at least of part of the wider electromagnetic radiation pattern is not affected by the nearby strong electromagnetic radiation pattern caused by the strong hidden node 603.

In one embodiment, the processor 120 of the wireless device 102 may retrieve, from the arbitration table 117 for a second frame of the multiple frames, a second destination MAC address of the second client wireless device 101B, an identifier of the second directional antenna, and an identifier the omnidirectional antenna. The processor 120 (e.g., the arbitrator 122 of the processor) may selectively control the switch to couple the radio to the second directional antenna and may transmit the second frame to the second client wireless device via the second directional antenna. The processor 120 (e.g., the arbitrator 122 of the processor) may further receive, from the second client wireless device, information about detection of a strong hidden node interrupting transmission by the second directional antenna. The processor 120, in response to the information about the detection of the strong hidden node, can decide to use a different antenna for a subsequent frame of the multiple frames associated with the second destination MAC address.

For example, the wireless device 102 may transmit, in view of the information about the hidden node, the subsequent frame associated with the second destination MAC address via the omnidirectional antenna. In other words, instead of transmitting the subsequent frame on the second directional antenna, the processor 120 determines that the subsequent frame should be transmitted via the omnidirectional antenna. Because the processor 120 can determine a different antenna to use for any particular frame, the processor 120 can assign the different combinations of transmit and receive antennas at different points in time using the arbitration table 117 or other types of data structures. The antennas of the antenna matrix can be logically represented by identifiers in the arbitration table 117. The processor 120 can switch to use a different antenna by making antenna assignments or reassignments in the arbitration table 117.

Figure 7:
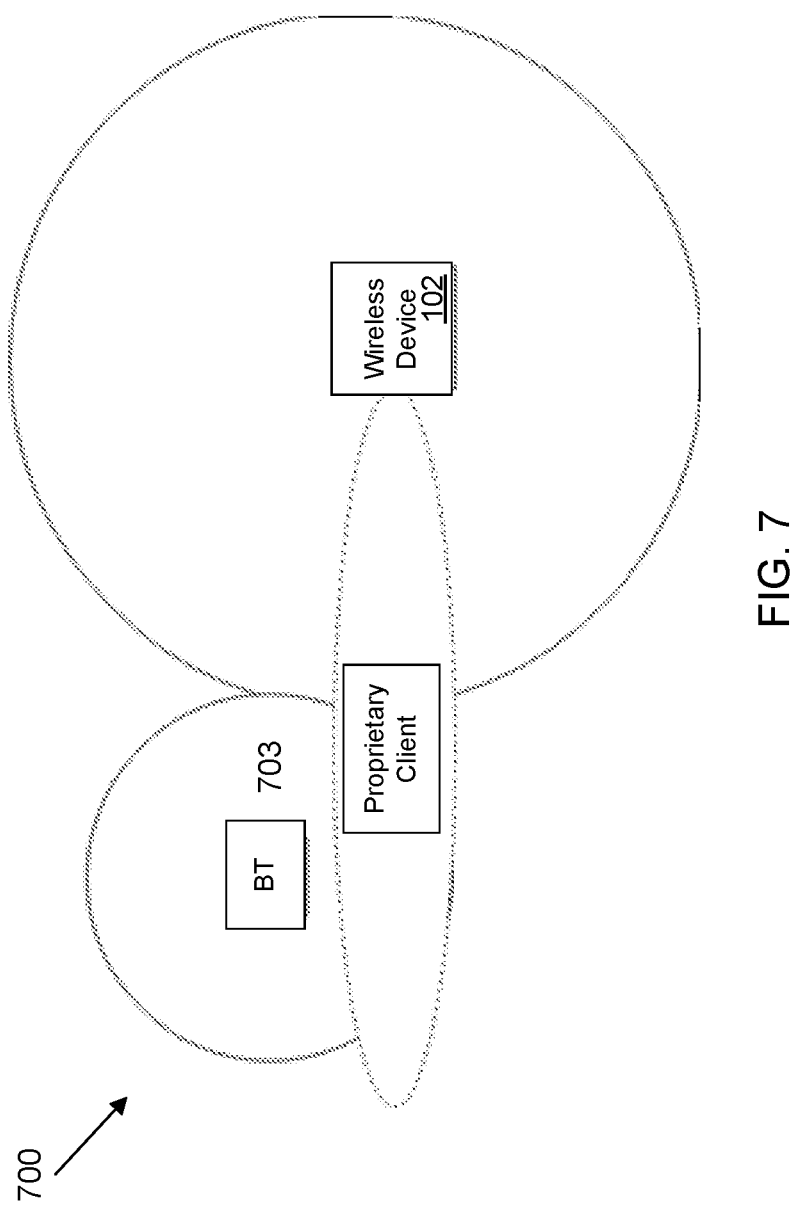
FIG. 7 is a diagram of detection of interference with a wireless personal area network (WPAN) device when communicating with a proprietary client wireless device according to an embodiment.

FIG. 7 is a diagram 700 of detection of interference with a wireless personal area network (WPAN) device when communicating with a proprietary client wireless device according to an embodiment. In this situation, the WPAN device may be a weak hidden node 703, which the proprietary client wireless device may detect similar to detecting the strong hidden node 603. A personal area network (PAN) is the interconnection of information technology devices within the range of an individual person, typically within a range of 10 meters. A WPAN is a low-powered PAN carried over a short-distance wireless network technology such as Infrared Data Association (IrDA), Wireless USB®, Bluetooth®, and Zigbee®. The weak hidden node 703 may be hidden in the sense that the weak hidden node 703 is not connected to the wireless AP device 102, but may still cause interference with wireless connectively by the client wireless device due its proximity to the weak hidden node 703. As discussed above, a node may be considered "weak" when the interference is measured to be less than the lower second threshold error rate.

Here, due to knowing that the WPAN device is linked to the proprietary client wireless device and where the WPAN device is located, the proprietary client wireless device may direct the wireless device 102 to switch from transmission with the omnidirectional antenna 205 to transmission with a directional antenna, e.g., which has a radiation pattern that is optimized to be strongest in the direction of the proprietary client wireless device. Application-level information from the proprietary client wireless devices may be employed in some embodiments with which the proprietary client wireless devices may direct the wireless device 102 to switch to transmit on a different antenna, e.g., in avoidance of interference. For example, an application or program, such as a streaming video container, may detect a decrease in data packet rate and communicate with firmware of the proprietary client wireless device. The firmware may then correlate the decrease in data packet rate with simultaneous use of the WPAN device. The firmware of the proprietary client wireless device may then communicate information regarding the correlation as detection of the weak hidden node 703 to the wireless device 102.

In one embodiment, for example, the processor 120 of the wireless device 102 may retrieve, from the arbitration table 117 for a second frame of the multiple frames, a second destination MAC address of the second client wireless device 101B and an identifier of the omnidirectional antenna. The processor 120 (e.g., the arbitrator 122) may cause the switch to couple the radio to the omnidirectional antenna 205 to cause the omnidirectional antenna to transmit the second frame to the second client wireless device. The processor 120 (e.g., the arbitrator 122) may further receive, from the second client wireless device, information about detection of a weak hidden node interrupting transmission by the omnidirectional antenna 205. The processor 120 may further, in response to the information about the detection of the weak hidden node, transmit, in view of the information about the weak hidden node, the subsequent frame of the multiples frames associated with the second destination MAC address via one of the first directional antenna or the second directional antenna.

Figure 8B:
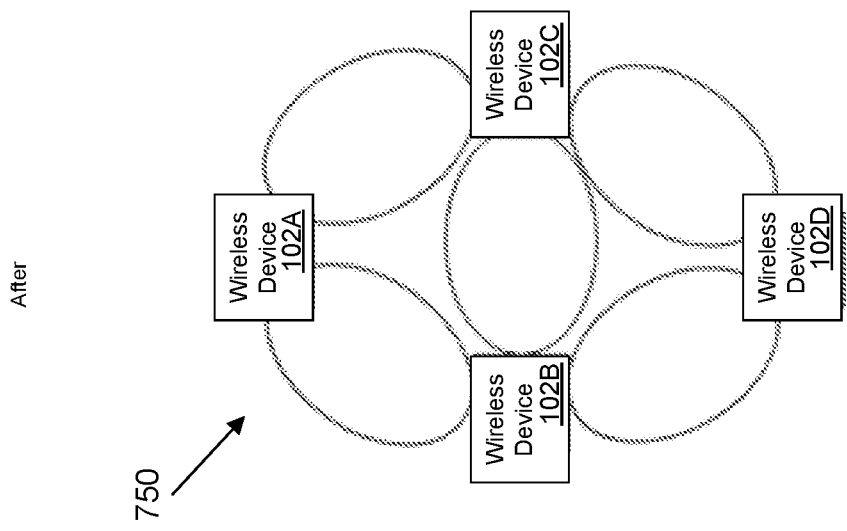
FIG. 8B is a diagram illustrating reduction of the wireless signal interference illustrated in FIG. 8A through use of multiple directional antennas in lieu of the omnidirectional antennas according to an embodiment.
Figure 8A:
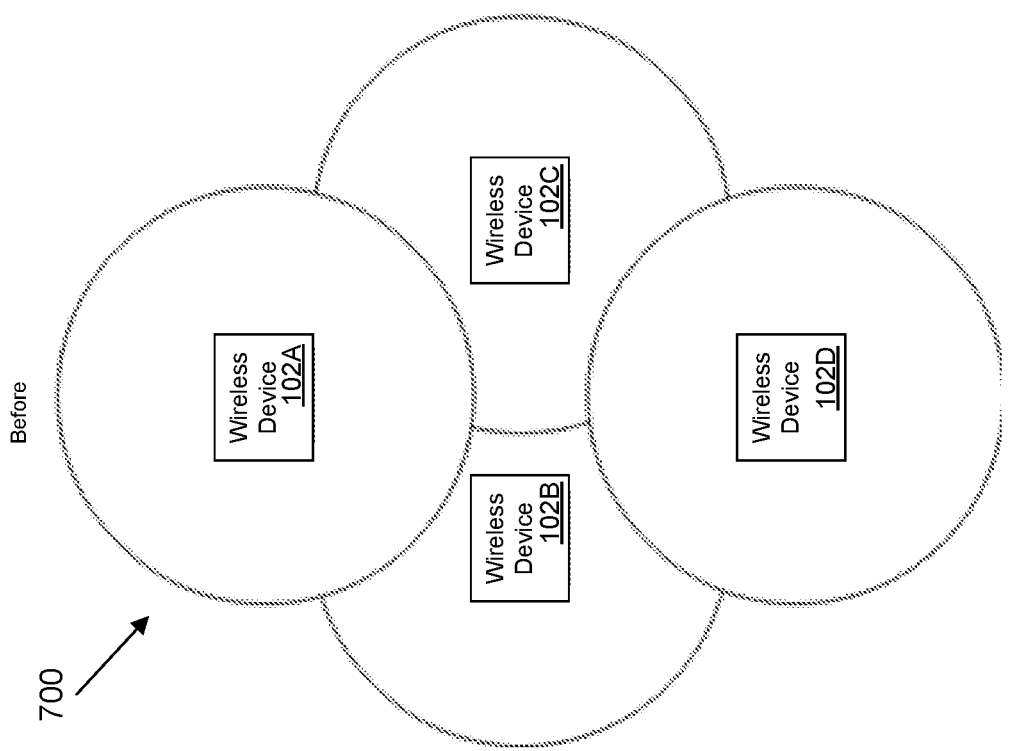
FIG. 8A is a diagram illustrating wireless signal interference from multiple wireless devices that transmit RF signals using omnidirectional antennas according to an embodiment.

FIG. 8A is a diagram illustrating wireless signal interference from multiple wireless devices that transmit RF signals using omnidirectional antennas according to an embodiment. As discussed, the wireless device 102 may be a wireless AP device or a client wireless device, in various embodiments. In the depicted example, the multiple wireless devices may be collocated and may include a first wireless device 102A, a second wireless device 102B, a third wireless device 102C, and a fourth wireless device 102D in an urban dense network. When transmitting with an omnidirectional antenna, the multiple wireless devices may wirelessly communicate with each other as illustrated with overlapping omnidirectional radiation patterns.

FIG. 8B is a diagram 750 illustrating reduction of the wireless signal interference illustrated in FIG. 8A through use of multiple directional antennas in lieu of the omnidirectional antennas according to an embodiment. For example, each wireless device 102A, 102B, 102C, and 102D may use a directional antenna to transmit towards another one of the multiple wireless devices to interlink the multiple wireless devices with each other. As illustrated in FIG. 8B, use of directional antennas in lieu of omnidirectional antennas may virtually eliminate inter-node interference between the multiple wireless devices.

Figure 9B:
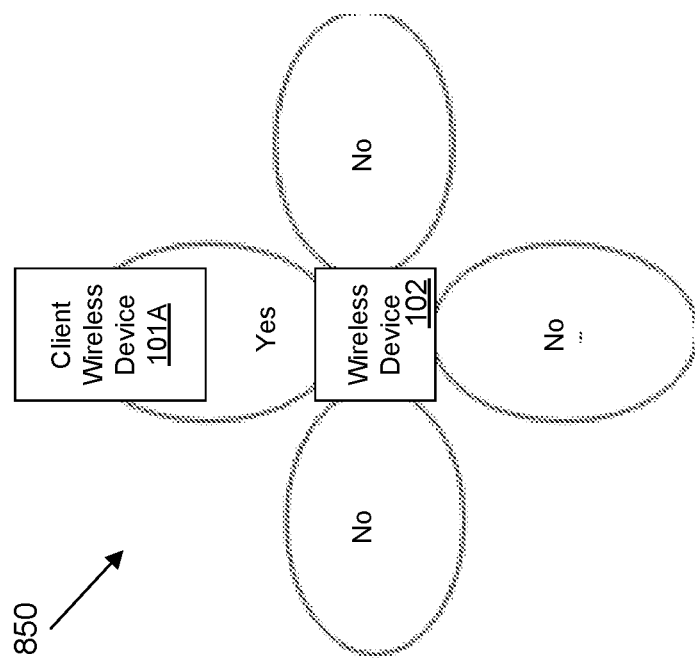
FIG. 9B is a diagram illustrating the improvement in ability to detect location of a client wireless device using multiple directional antennas according to an embodiment.
Figure 9A:
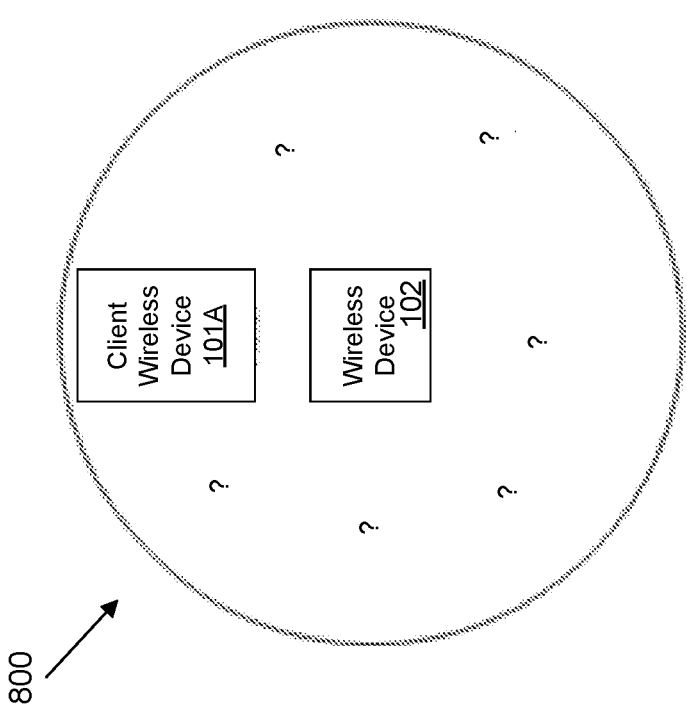
FIG. 9A is a diagram illustrating the challenge with detection location of a client wireless device using an omnidirectional antenna according to an embodiment.

FIG. 9A is a diagram 800 illustrating the challenge with detection location of a client wireless device 101A or 101B using the omnidirectional antenna 205 according to an embodiment. The client wireless device 101A may be located in a twelve o'clock position from the wireless device 102, but the wireless device 102 does not detect its location.

FIG. 9B is a diagram 850 illustrating the improvement in ability to detect location of a wireless client wireless device 101A or 101B using multiple directional antennas according to an embodiment. The wireless device 102, upon transmission from a directional antenna in the twelve o'clock direction, now identifies the location of the client wireless device 101A and detects no other client wireless device associated with a radiation pattern of another of the four directional antenna illustrated in FIG. 9B.

Figure 10:
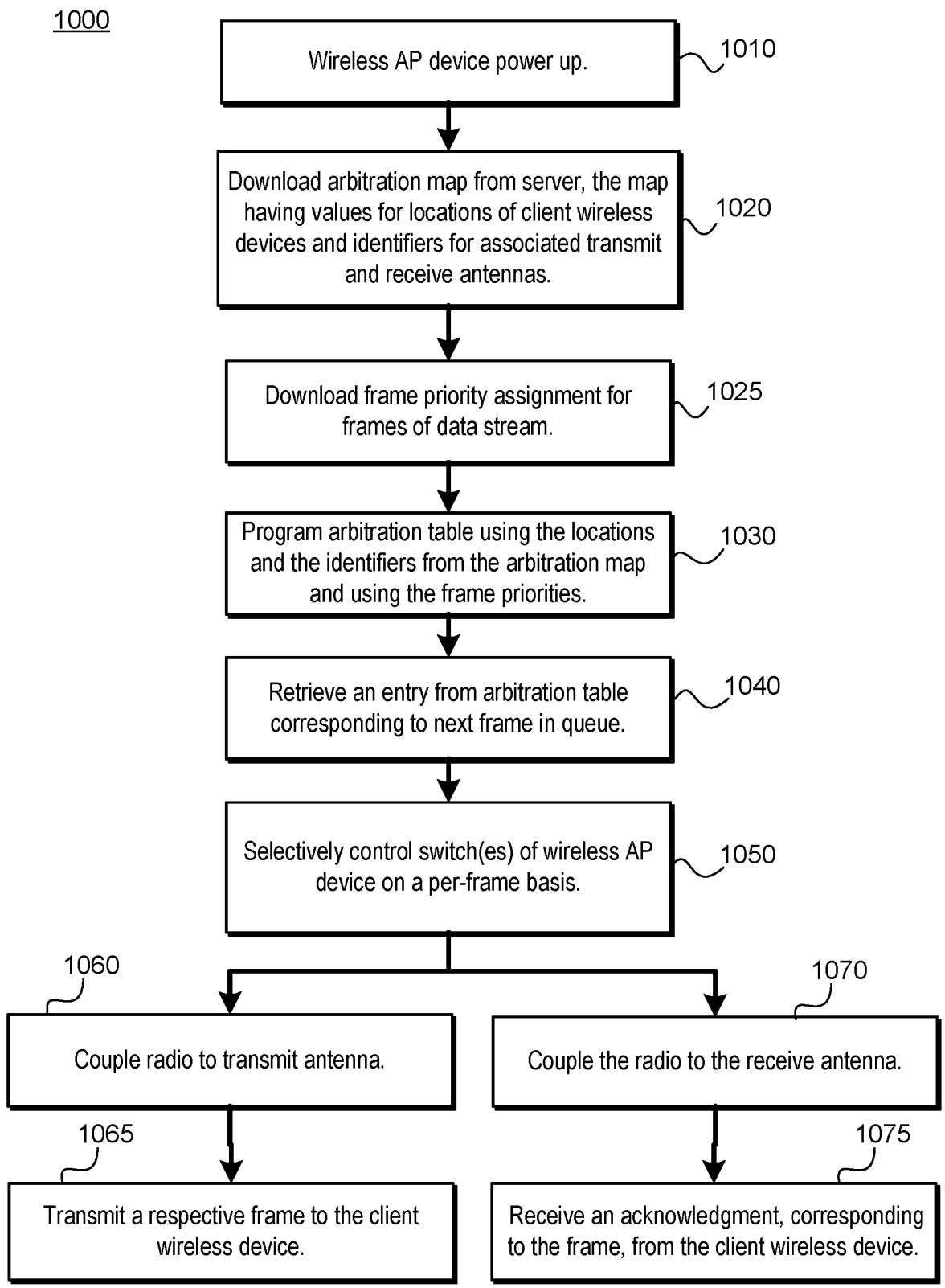
FIG. 10 is a flow diagram of a method for programming an arbitration table within the wireless access point device using data from an arbitration map downloaded from a cloud server according to an embodiment.

FIG. 10 is a flow diagram of a method 1000 for programming the arbitration table 117 within the wireless AP device (e.g., the wireless device 102) using data from the arbitration map 162 downloaded from the server 150 according to an embodiment. Method 1000 may be performed by processing logic that may comprise hardware (e.g., circuitry, dedicated logic, programmable logic, microcode, etc.), software (such as instructions running on the processor), firmware or a combination thereof. In one embodiment, a processor of the hybrid directional antenna system 100 or the wireless device 102 (e.g., a wireless AP device) performs the method 1000. Alternatively, other components of the wireless AP device may perform some or all of the operations of the method 1000.

The method 1000 may including operating the disclosed wireless AP device, wherein the wireless AP device includes a radio, a first directional antenna, a second directional antenna, an omnidirectional antenna, and a switch selectively coupled between the radio and the first directional antenna, the second directional antenna, and the omnidirectional antenna. With reference to FIG. 10, the method 1000 may begin with the wireless AP device powering up (1010). The method 1000 may continue with the processing logic downloading, from the server 150, the arbitration map including locations of client wireless devices and, for each location, an identifier of a transmit antenna and/or receive antenna that have best signal reception from that location (1020). The identifier of each transmit antenna and receive antenna may identify one of the first directional antenna, the second directional antenna, or the omnidirectional antenna. The method 1000 may continue with the processing logic downloading frame priority assignments for the frames of the data stream (1025). The frame priority assignments may include one or a combination of MAC address priority and application level priority.

With continued reference to FIG. 10, the method 1000 may continue with the processing logic programming, using the locations and the identifiers from the arbitration map and using the frame priority assignments, an arbitration table (or other data structure) in association with multiple frames of a data stream (1030). The multiple frames may be buffered into a queue for transmission. For example, a first entry in the arbitration table may include an identifier of a first frame of the multiple frames, a destination medium access control (MAC) address of a first client wireless device, an identifier of the first directional antenna, and an identifier of the omnidirectional antenna. A second entry in the arbitration table may include an identifier of a second frame of the multiple frames, a destination MAC address of a second client wireless device and an identifier of the third directional antenna. The first frame may also include a higher application level priority than the second or a third frame. The method 1000 may continue with the processing logic retrieving an entry from the arbitration table corresponding to a next frame in the queue (1040). In one implementation, this may be retrieving the first entry, for the first frame, from the arbitration table.

The method 1000 may continue with the processing logic selectively controlling the switch (or a cascaded series of switches) on a per-frame basis (e.g., starting with the first frame, then the second frame, and so forth) to transmit each respective frame and receive an acknowledgement of receipt of the respective frame by a client wireless device (1050). For example, in one embodiment, the method includes the processing logic selectively controlling the switch to couple the radio to a transmit antenna, e.g., the first directional antenna (1060). The method 1000 may continue with the processing logic transmitting the first frame to the first client wireless device via the transmit antenna, e.g., the first directional antenna (1065). The method 1000 may continue with the processing logic causing the switch to couple the radio to a receive antenna, e.g., the omnidirectional antenna (1070). The method 1000 may continue with the processing logic receiving a first acknowledgment, corresponding to the first frame, from the first client wireless device via the receive antenna, e.g., the omnidirectional antenna (1075).

Figures 11A, 11B:
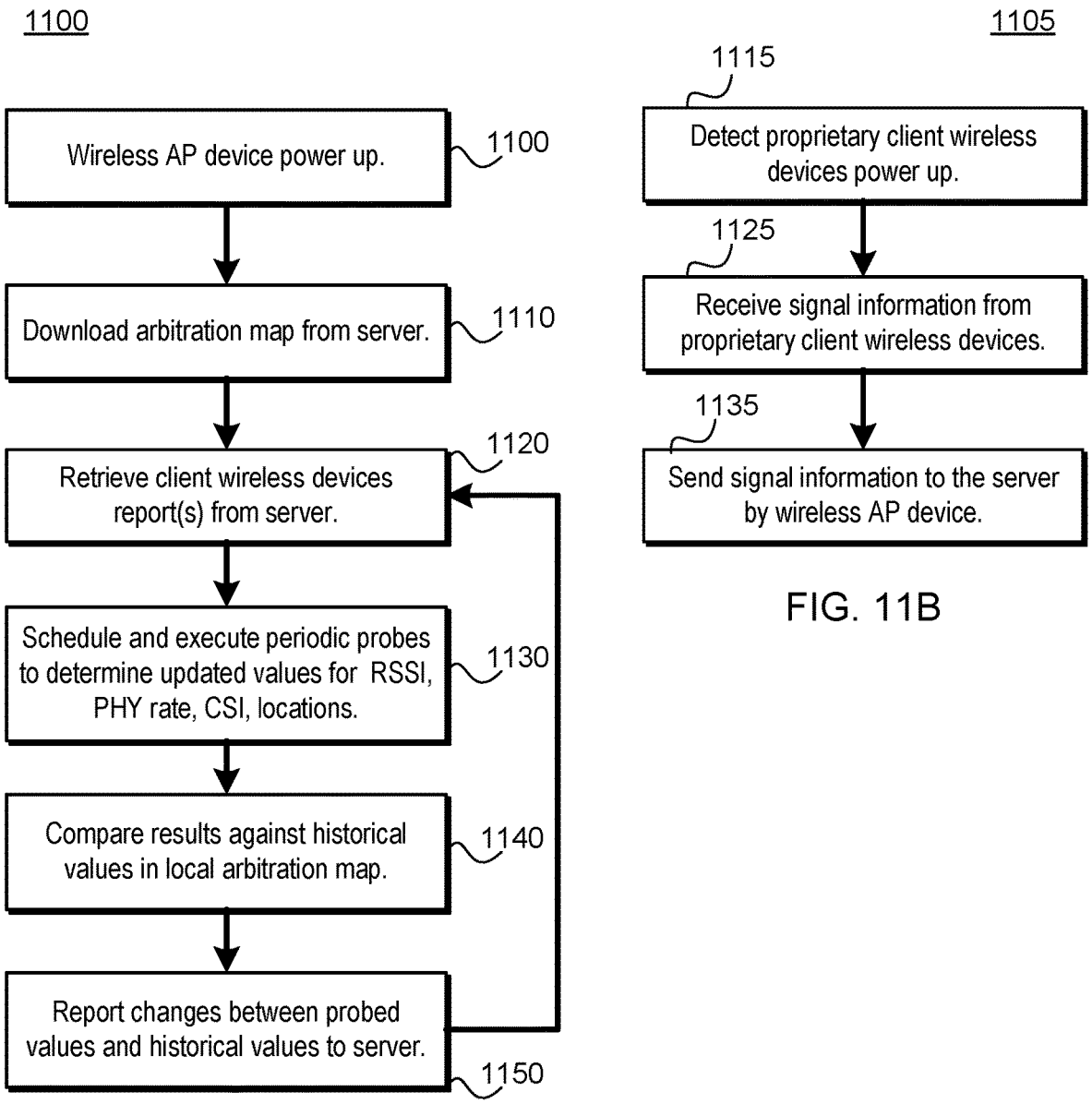
FIG. 11A is a flow diagram of a method for updating data from an arbitration map downloaded by the wireless access point device from a cloud server according to an embodiment.
FIG. 11B is a flow diagram of a method for receiving signal quality information from a proprietary client wireless device according to an embodiment.

FIG. 11A is a flow diagram of a method 1100 for updating data from an arbitration map downloaded by the wireless access point device from a cloud server according to an embodiment. Method 1100 may be performed by processing logic that may comprise hardware (e.g., circuitry, dedicated logic, programmable logic, microcode, etc.), software (such as instructions running on the processor), firmware or a combination thereof. In one embodiment, a processor of the hybrid directional antenna system 100 or the wireless device 102 (e.g., a wireless AP device) performs the method 1100. Alternatively, other components of the wireless AP device may perform some or all of the operations of the method 1100.

With referenced to FIG. 11A, the method 1100 may begin with the wireless AP device powering up (1100). The method 1100 may continue with the processing logic downloading the arbitration map 162 from the server 150 (1110). The method 1100 may continue with the processing logic retrieving signal quality reports (or associated data) for client wireless devices from the server (1120). The method 1100 may continue with the processing logic scheduling and executing periodic probes to determine updated values for RSSI, PHY rate, CSI, and locations of the client wireless devices received in return acknowledgments from the period probes (1130). The method 1100 may continue with the processing device comparing results of the periodic probes against historical values in the arbitration map 162 (1140). The method 1100 may continue with the processing logic reporting, to the server 150, the changes (or the difference) between the probed values (in block 1130) with the historical values (1150). In this way, the arbitration map 162 and the historical signal information 164 may be updated on the storage device 160 of the server 150 with accurate data for the client wireless devices.

FIG. 11B is a flow diagram of a method 1105 for receiving signal quality information from a proprietary client wireless device according to an embodiment. Method 1105 may be performed by processing logic that may comprise hardware (e.g., circuitry, dedicated logic, programmable logic, microcode, etc.), software (such as instructions running on the processor), firmware or a combination thereof. In one embodiment, a processor of the hybrid directional antenna system 100 or the wireless device 102 (e.g., a wireless AP device) performs the method 1105. Alternatively, other components of the wireless AP device may perform some or all of the operations of the method 1105.

With reference to FIG. 11B, the method 1105 may begin with the processing logic detecting the proprietary client wireless devices powering up (1115). The method 1105 may continue with the processing logic receiving signal information from proprietary client wireless devices such as at least one of RSSI, CSI, or PHY rate (1125). The method 1105 may continue with the processing logic sending the signal information to the server 150 for storage and processing (1135). In this way, the server 150 may keep updated the client device reports 168, the historical signal information 164, and the arbitration map 162.

In various embodiments, the historical signal information 164 allows the server 150 to generate a heat map of RF signals within a space where client wireless devices 101A, 101B can receive RF signals. In one embodiment, the heat map is the arbitration map 162, which includes a list of potential best locations for client wireless devices in terms of strongest connectivity (whether TX or RX) to the wireless AP device. In various embodiments, the potential best locations depend on connection frequency, historical patterns of connectivity, and other such data. This map may help improve user experiences with RF connectivity from different locations in a home, office, or other building. For example, before a new client wireless device arrives at a particular location, previous sensors (and/or other wireless devices) may be included in a lookup of signal reports available. In one embodiment, the server 150 may push this heat map to the new client wireless device, which may then choose a location in the building to be located for strongest connectivity to the wireless AP device. As a further embodiment, the wireless AP device gets a notification from a user that bought a new client wireless device (like a smart TV or headend), and the software of the wireless AP device may inform the user of the best location for best reception of the new client wireless device.

Figure 12:
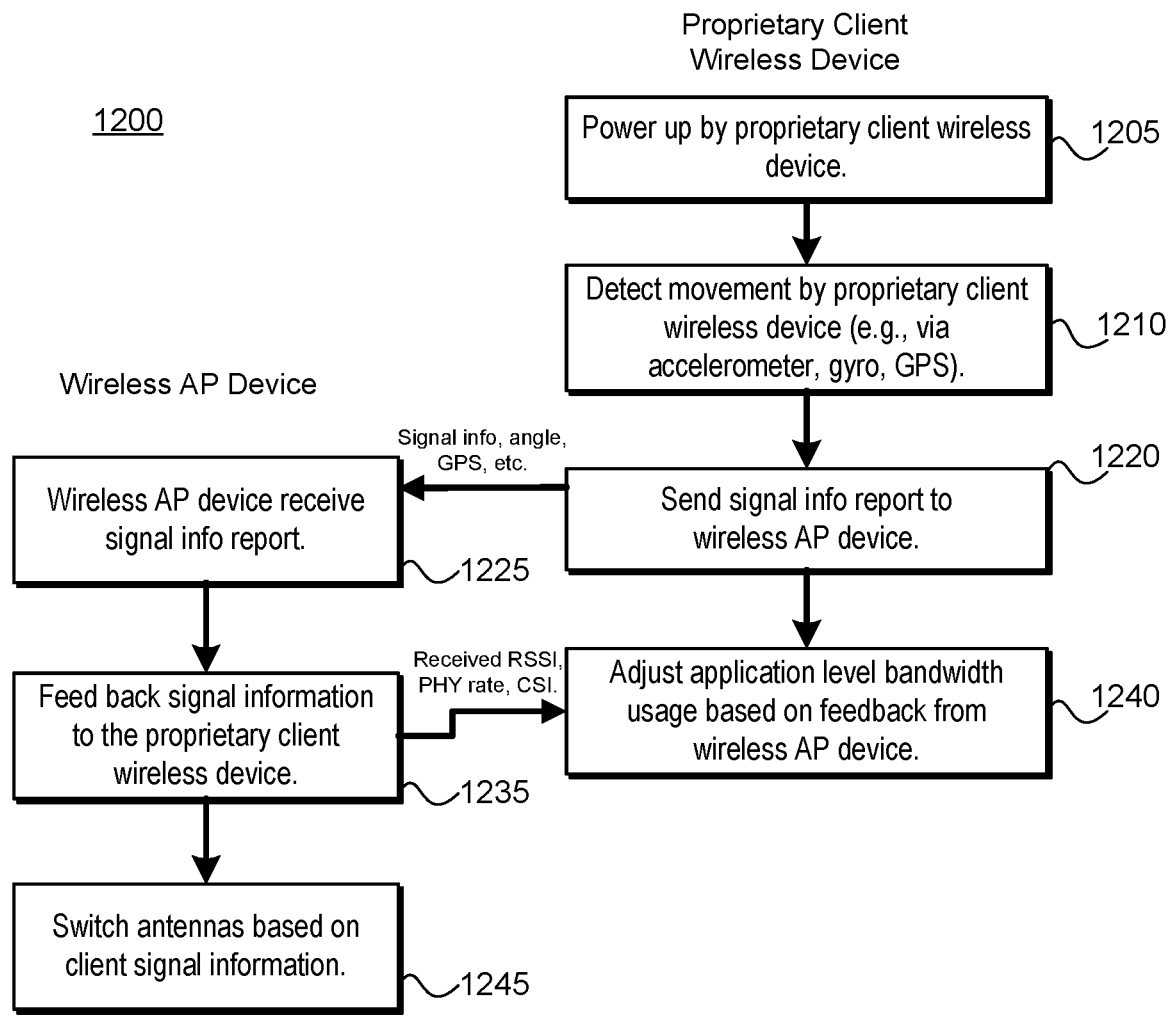
FIG. 12 is a flow diagram of a method of functionality of the wireless access point device and of a proprietary client wireless device that directly exchange data according to an embodiment.

FIG. 12 is a flow diagram of functionality of a method 1200 of the wireless AP device (such as the wireless device 102) and of a proprietary client wireless device that directly exchange data according to an embodiment. Method 1200 may be performed by processing logic that may comprise hardware (e.g., circuitry, dedicated logic, programmable logic, microcode, etc.), software (such as instructions running on the processor), firmware or a combination thereof. In one embodiment, a processor of the hybrid directional antenna system 100 or the wireless device 102 (e.g., a wireless AP device) performs the method 1200. Alternatively, other components of the wireless AP device or a proprietary client wireless device may perform some or all of the operations of the method 1200.

With reference to FIG. 12, the method 1200 may begin with the proprietary client wireless device powering up (1205). The method 1200 may continue with the proprietary client wireless device detecting movement, e.g., through an accelerometer, a gyroscope, or a Global Positioning System (GPS) device (1210). The method 1200 may continue with the proprietary client wireless device sending a signal information report to the wireless AP device, to include signal information (e.g., RSSI, CSI, PHY rate, time stamps) and location data such a GPS coordinate and/or an angle of its location with respect to the AP wireless device (1220). In one embodiment, the signal information report is sent in response to receipt of data packets by the first client wireless device from the wireless AP device.

With continued reference to FIG. 12, the method 1200 may continue with the processing logic (of the wireless AP device) receiving the signal information report (1225). The method 1200 may continue with the processing logic feeding back, to the proprietary client wireless device, the signal information it has received from the proprietary client wireless device (1235). The method 1200 may continue with the processing logic switching at least one of a transmit antenna or a receive antenna to a different transmit antenna or receive antenna based on the signal information received from the proprietary client wireless device (1245). In one embodiment, to change the antenna choice for future frames associated with a particular MAC address based on the signal information, the processing logic reassigns, within the arbitration table 117, an identifier for one of the transmit antenna or the receive antenna to, respectively, the different transmit antenna and/or the different receive antenna for subsequent frames of the multiple frames. This reassignment may be viewed as programming the arbitration table 117 for future frame transmission.

The method 1200 may continue with the proprietary client wireless device adjusting application level bandwidth usage (or other streaming parameter) based on the feedback from the wireless AP device (1240). For example, certain video streaming (such as 4K video) requires a certain quality level. If the wireless AP device or the server detects a drop in RSSI or PHY rate, this may be contained in the feedback sent back to the proprietary client wireless device at block 1235. The proprietary client wireless device may include an application to process this feedback information and determine whether to throttle (switch streaming rate to downgrade video quality) to avoid buffering. If the proprietary client wireless device waits to detect these changes in parameters itself, it may be too late to avoid buffering, e.g., may not know the PHY rate until video is streaming at the device.

Figure 13:
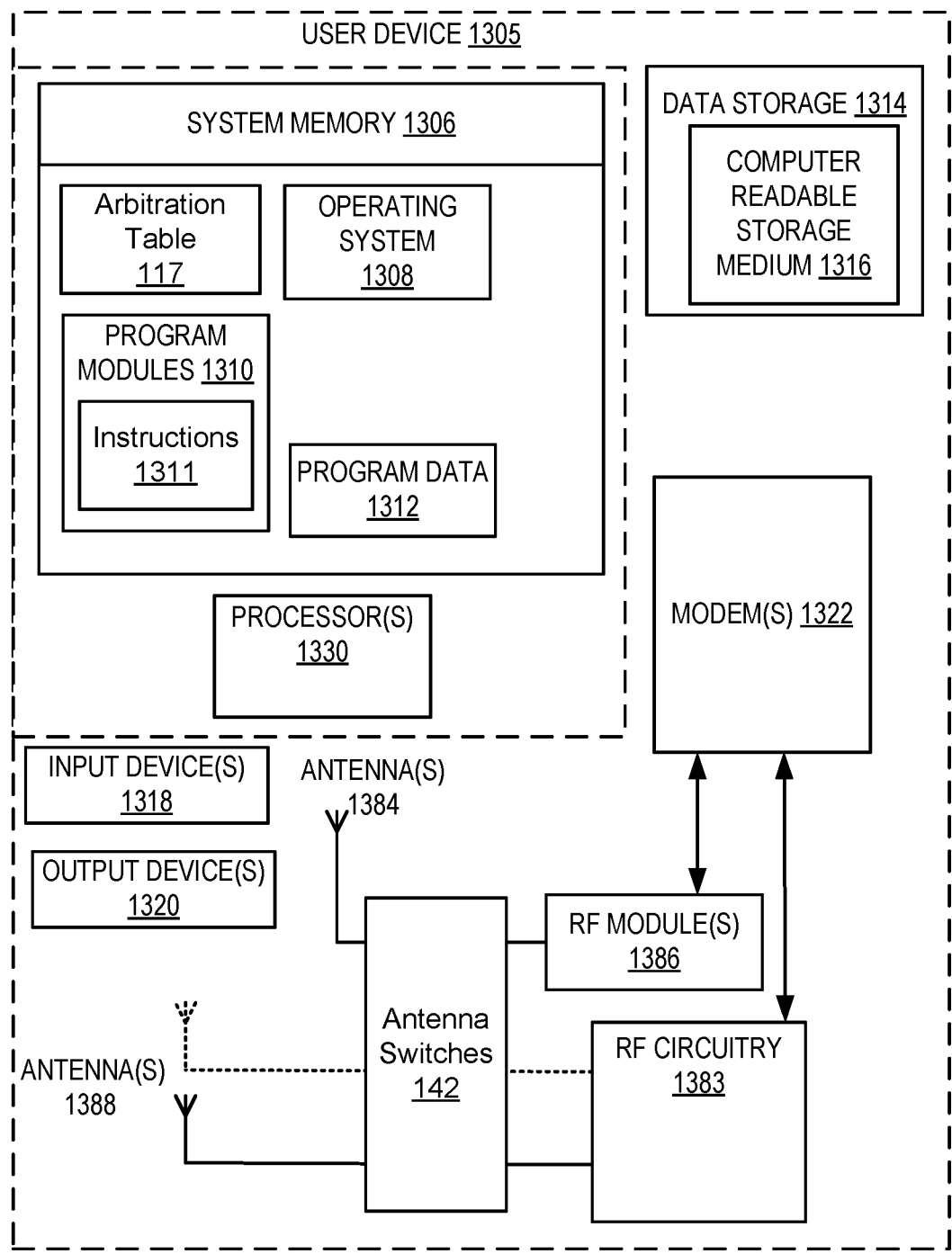
FIG. 13 is a block diagram of a user device in which embodiments of hybrid directional antenna system may be implemented according to various embodiments.

FIG. 13 is a block diagram of a user device 805 in which embodiments of employing a hybrid directional antenna system may be implemented. The user device 805 may correspond to the wireless device 102 or one of the client wireless devices 101A or 101B (FIGS. 1A-1C). The user device 1305 may be any type of computing device such as an electronic book reader, a PDA, a mobile phone, a laptop computer, a portable media player, a tablet computer, a camera, a video camera, a netbook, a desktop computer, a gaming console, a DVD player, a computing pad, a media center, and the like. The user device 1305 may be any portable or stationary user device. For example, the user device 1305 may be an intelligent voice control and speaker system. Alternatively, the user device 1305 can be any other device used in a WLAN network (e.g., Wi-Fi® network), a WAN network, or the like.

The user device 1305 includes one or more processor(s) 1330, such as one or more CPUs, microcontrollers, field programmable gate arrays, or other types of processors. The user device 1305 also includes system memory 1306, which may correspond to any combination of volatile and/or non-volatile storage mechanisms. The system memory 1306 stores information that provides operating system component 1308, various program modules 1310 (to include instructions 1311 or other code), program data 1312, and/or other components. In one embodiment, the system memory 1306 stores instructions of the methods 1000, 1100, 1105, and 1200 as described herein. The user device 1305 performs functions by using the processor(s) 1330 to execute instructions provided by the system memory 1306, as may be loaded by one of the program modules 1310. The instructions may implement the arbitrator 122 and the framework 124 that are to program the arbitration table 117 (or other data structure). The processor(s) 1330 may then retrieve entries from the arbitration table to determine which of multiple antenna(s) 1384 and 1388 to select, via selective control of the antenna switches 142, over which to transmit frames of a data stream and to receive acknowledgements.

The user device 1305 also includes a data storage device 1314 that may be composed of one or more types of removable storage and/or one or more types of non-removable storage. The data storage device 1314 includes a computer-readable storage medium 1316 on which is stored one or more sets of instructions embodying any of the methodologies or functions described herein. Instructions for the program modules 1310 may reside, completely or at least partially, within the computer-readable storage medium 1316, system memory 1306 and/or within the processor(s) 1330 during execution thereof by the user device 1305, the system memory 1306 and the processor(s) 1330 also constituting computer-readable media. The user device 1305 may also include one or more input devices 1318 (keyboard, mouse device, specialized selection keys, etc.) and one or more output devices 1320 (displays, printers, audio output mechanisms, etc.).

The user device 1305 further includes a modem 1322 to allow the user device 1305 to communicate via a wireless network (e.g., such as provided by the wireless communication system) with other computing devices, such as remote computers, an item providing system, and so forth. The modem 1322 can be connected to RF circuitry 1383 and zero or more RF modules 1386. The RF circuitry 1383 may be a WLAN module, a WAN module, PAN module, or the like. Antennas 13813 are coupled to the RF circuitry 1383, which is coupled to the modem 1322. Zero or more antennas 1384 can be coupled to one or more RF modules 1386, which are also connected to the modem 1322. The zero or more antennas 1384 may be GPS antennas, NFC antennas, other WAN antennas, WLAN or PAN antennas, or the like. The modem 1322 allows the user device 1305 to handle both voice and non-voice communications (such as communications for text messages, multimedia messages, media downloads, web browsing, etc.) with a wireless communication system. The modem 1322 may provide network connectivity using various types of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc., although not all of these mobile network technologies may be available.

The modem 1322 may generate signals and send these signals to one of the multiple antennas 1388, and 1384 via RF circuitry 1383, and RF module(s) 1386 as descried herein. User device 1305 may additionally include a WLAN module, a GPS receiver, a PAN transceiver and/or other RF modules. These RF modules may additionally or alternatively be connected to one or more of antennas 1384, 1388. Antennas 1384, 1388 may be configured to transmit in different frequency bands and/or using different wireless communication protocols. The antennas 1384, 1388 may be directional, omnidirectional, or non-directional antennas. In addition to sending data, antennas 1384, 1388 may also receive data, which is sent to appropriate RF modules connected to the antennas.

In one embodiment, the user device 1305 establishes a first connection using a first wireless communication protocol, and a second connection using a different wireless communication protocol. The first wireless connection and second wireless connection may be active concurrently, for example, if a user device is downloading a media item from a server (e.g., via the first connection) and transferring a file to another user device (e.g., via the second connection) at the same time. Alternatively, the two connections may be active concurrently during a handoff between wireless connections to maintain an active session (e.g., for a telephone conversation). Such a handoff may be performed, for example, between a connection to a WLAN hotspot and a connection to a wireless carrier system. In one embodiment, the first wireless connection is associated with a first resonant mode of an antenna building that operates at a first frequency band and the second wireless connection is associated with a second resonant mode of the antenna building that operates at a second frequency band. In another embodiment, the first wireless connection is associated with a first antenna element and the second wireless connection is associated with a second antenna element. In other embodiments, the first wireless connection may be associated with a media purchase application (e.g., for downloading electronic books), while the second wireless connection may be associated with a wireless ad hoc network application. Other applications that may be associated with one of the wireless connections include, for example, a game, a telephony application, an Internet browsing application, a file transfer application, a global positioning system (GPS) application, and so forth.

Though a modem 1322 is shown to control transmission and reception via antenna (1384, 1388), the user device 1305 may alternatively include multiple modems, each of which is configured to transmit/receive data via a different antenna and/or wireless transmission protocol.

The user device 1305 delivers and/or receives items, upgrades, and/or other information via the network. For example, the user device 1305 may download or receive items from an item providing system. The item providing system receives various requests, instructions and other data from the user device 1305 via the network. The item providing system may include one or more machines (e.g., one or more server computer systems, routers, gateways, etc.) that have processing and storage capabilities to provide the above functionality. Communication between the item providing system and the user device 1305 may be enabled via any communication infrastructure. One example of such an infrastructure includes a combination of a wide area network (WAN) and wireless infrastructure, which allows a user to use the user device 1305 to purchase items and consume items without being tethered to the item providing system via hardwired links. The wireless infrastructure may be provided by one or multiple wireless communications systems, such as one or more wireless communications systems. One of the wireless communication systems may be a wireless local area network (WLAN) hotspot connected with the network. The WLAN hotspots can be created by Wi-Fi® products based on IEEE 802.11x standards by Wi-Fi Alliance. Another of the wireless communication systems may be a wireless carrier system that can be implemented using various data processing equipment, communication towers, etc. Alternatively, or in addition, the wireless carrier system may rely on satellite technology to exchange information with the user device 1305.

The communication infrastructure may also include a communication-enabling system that serves as an intermediary in passing information between the item providing system and the wireless communication system. The communication-enabling system may communicate with the wireless communication system (e.g., a wireless carrier) via a dedicated channel, and may communicate with the item providing system via a non-dedicated communication mechanism, e.g., a public Wide Area Network (WAN) such as the Internet.

The user devices 1305 are variously configured with different functionality to enable consumption of one or more types of media items. The media items may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), and multi-media content. The user devices 1305 may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like.

In the above description, numerous details are set forth. It will be apparent, however, to one of ordinary skill in the art having the benefit of this disclosure, that embodiments may be practiced without these specific details. In some instances, well-known buildings and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required building for a variety of these systems will appear from the description below. In addition, the present embodiments are not described with reference to any particular programming language. It will be appreciated that a variety of programming languages may be used to implement the teachings of the present disclosure as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A wireless device comprising:
   a radio;
   a first directional antenna;
   a second directional antenna;
   an omnidirectional antenna;
   a switch selectively coupled between the radio and the first directional antenna, the second directional antenna, and the omnidirectional antenna; and
   a processor coupled to the switch, wherein the processor is to, for a first frame of a plurality of frames:
      determine, based on an arbitration table, a first destination medium access control (MAC) address of a first client wireless device, wherein the arbitration table includes for each frame of the plurality of frames: (a) a frame identifier, (b) destination MAC address for the frame, (c) identifier of an antenna for transmitting the frame, and (d) identifier of an antenna for receiving acknowledgement data for the frame;
      add, to the first frame, metadata comprising the first destination MAC address, an identifier of the first directional antenna, and an identifier of the omnidirectional antenna retrieved from the arbitration table;
      cause, using the metadata in the first frame, the switch to couple the radio to the first directional antenna;
      transmit the first frame to the first client wireless device via the first directional antenna, wherein the first client wireless device is located along a first direction with respect to the wireless device;
      cause, using the metadata in the first frame, the switch to couple the radio to the omnidirectional antenna; and
      receive a first acknowledgment, corresponding to the first frame, from the first client wireless device via the omnidirectional antenna.

2. The wireless device of claim 1, wherein the processor is further to, for a second frame of the plurality of frames:
   determine a second destination MAC address of a second client wireless device;
   cause the switch to couple the radio to the second directional antenna;
   transmit the second frame to the second client wireless device via the second directional antenna concurrently with transmission of the first frame via the first directional antenna, wherein the second client wireless device is located along a second direction with respect to the wireless device; and
   receive a second acknowledgement, corresponding to the second frame, from the second client wireless device via the second directional antenna.

3. The wireless device of claim 1, further comprising a third directional antenna selectively coupled to the radio and to the switch and configured to radiate radio frequency energy in a third direction, wherein the processor is further to:
   transmit a probing signal via the first directional antenna, the second directional antenna, and the third directional antenna;
   receive, from the first client wireless device in response to the probing signal, a first signal strength value via the first directional antenna, a second signal strength value via the second directional antenna, and a third signal strength value via the third directional antenna;
   determine that the third signal strength value is greater than the first and the second signal strength values; and
   transmit a subsequent frame of the plurality of frames to the first client wireless device via the third directional antenna, wherein the first client wireless device has moved from being located along the first direction to being located along the third direction.

4. The wireless device of claim 1, further comprising a third directional antenna selectively coupled to the radio and to the switch, wherein the processor is further to:
receive, for the first client wireless device, signal quality information and criteria data, the criteria data comprising at least one of bandwidth requirements, traffic patterns, supported modes, or application level priority for the first client wireless device; and
transmit, based on the signal quality information and the criteria data, a subsequent frame of the plurality of frames to the first client wireless device via one of the second directional antenna, the third directional antenna, or the omnidirectional antenna.

5. The wireless device of claim 1, further comprising:
a third directional antenna selectively coupled to the radio and to the switch; and
a baseband channel estimator coupled to the processor and to the radio, wherein the baseband channel estimator is to detect receipt of channel properties information that represent wireless signal propagation characteristics of wireless signals received from the first client wireless device; and
wherein the processor is further to:
determine, from the channel properties information, received signal quality information; and
transmit, based on the received signal quality information, a subsequent frame of the plurality of frames to the first client wireless device via one of the second directional antenna, the third directional antenna, or the omnidirectional antenna.

6. The wireless device of claim 1, further comprising an integrated system-on-a-chip (SoC) that comprises the radio and a general purpose input/output (GPIO) multiplexer coupled to the radio, the GPIO multiplexer to selectively control the switch, which is located outside of the integrated SoC.

7. The wireless device of claim 1, wherein the first acknowledgment from the first client wireless device further includes data comprising at least one of location data, received signal strength information (RSSI), physical layer (PHY) rate, or channel state information (CSI) of the first client wireless device.

8. The wireless device of claim 1, wherein the processor is further to:
retrieve, from the arbitration table for a second frame of the plurality of frames, a second destination MAC address of a second client wireless device and the identifier of the omnidirectional antenna;
cause the switch to couple the radio to the omnidirectional antenna;
transmit the second frame to the second client wireless device via the omnidirectional antenna;
receive, from the second client wireless device, information about a weak hidden node interrupting transmission by the omnidirectional antenna; and
transmit, based on the information about the weak hidden node, a subsequent frame of the plurality of frames associated with the second destination MAC address via one of the first directional antenna or the second directional antenna.

9. The wireless device of claim 1, wherein the processor is further to:
retrieve, from the arbitration table for a second frame of the plurality of frames, a second destination MAC address of a second client wireless device, the identifier of the second directional antenna, and the identifier of the omnidirectional antenna;
cause the switch to couple the radio to the second directional antenna;
transmit the second frame to the second client wireless device via the second directional antenna;
receive, from the second client wireless device, information about detection of a strong hidden node interrupting transmission by the second directional antenna; and
transmit, based on the information about the strong hidden node, a subsequent frame of the plurality of frames associated with the second destination MAC address via the omnidirectional antenna.

10. A method comprising:
operating a wireless access point (AP) device, wherein the wireless AP device comprises a radio, a first directional antenna, a second directional antenna, an omnidirectional antenna, and a switch selectively coupled between the radio and the first directional antenna, the second directional antenna, and the omnidirectional antenna, wherein operating the wireless AP device comprises:
determining, based on an arbitration table for a first frame of a plurality of frames, a first destination medium access control (MAC) address of a first client wireless device, wherein the arbitration table includes for each frame of the plurality of frames: (a) a frame identifier, (b) destination MAC address for the frame, (c) identifier of an antenna for transmitting the frame, and (d) identifier of an antenna for receiving acknowledgement data for the frame;
adding, to the first frame, metadata comprising the first destination MAC address, an identifier of the first directional antenna, and an identifier of the omnidirectional antenna retrieved from the arbitration table;
causing, by a processor of the wireless AP device, using the metadata in the first frame, the switch to couple the radio to the first directional antenna;
transmitting the first frame to the first client wireless device via the first directional antenna, wherein the first client wireless device is located along a first direction with respect to the AP wireless device;
causing, by the processor using the metadata in the first frame, the switch to couple the radio to the omnidirectional antenna; and
receiving a first acknowledgment, corresponding to the first frame, from the first client wireless device via the omnidirectional antenna.

11. The method of claim 10, wherein operating the wireless AP device further comprises:
receiving a location of the first client wireless device by detecting received signal strength information (RSSI) back from the first client wireless device via at least one of the first directional antenna or the second directional antenna; and
transmitting, based on the RSSI, a subsequent frame of the plurality of frames to the first client wireless device via one of the second directional antenna, a third directional antenna, or the omnidirectional antenna.

12. The method of claim 10, wherein operating the wireless AP device further comprises:
downloading, from a server, an arbitration map comprising locations of a plurality of client wireless devices and, for each location, an identifier of a transmit antenna and of a receive antenna, wherein each identifier identifies one of the first directional antenna, the second directional antenna, or the omnidirectional antenna;

downloading, from the server, application level priority assignments for respective frames of the plurality of frames of a data stream; and programming, by a processor of the wireless AP device, the transmit antenna and the receive antenna associated with the plurality of frames within the arbitration table using the application level priority assignments, the locations and corresponding ones of the identifiers from the arbitration map, wherein each of the plurality of frames is associated with a destination MAC address corresponding to one of the plurality of client wireless devices.

13. The method of claim 12, wherein a second client wireless device is located along a second direction with respect to the AP wireless device, and wherein operating the wireless AP device further comprises:

determining, from one of the arbitration map or signal probing, a first location of the first client wireless device located along the first direction; and determining, from one of the arbitration map or signal probing, a second location of the second client wireless device located along the second direction; and wherein the programming comprises:

assigning the first directional antenna to be the transmit antenna for first frames of the plurality of frames comprising the first destination MAC address of the first client wireless device; and assigning the second directional antenna to be the transmit antenna for second frames of the plurality of frames comprising a second destination MAC address of the second client wireless device.

14. The method of claim 10, wherein operating the wireless AP device further comprises:

receiving, from a server, a report comprising historical values for at least one of location data, received signal strength information (RSSI), physical layer (PHY) rate, or channel state information (CSI) of a plurality of client wireless devices;

performing active probing of the plurality of client wireless devices, to generate updated values for the least one of the location data, the RSSI, the PHY rate, or the CSI of the plurality of client wireless devices; and reporting, to the server and based on the updated values, changes between the historical values and the updated values.

15. The method of claim 10, wherein operating the wireless AP device further comprises:

receiving, from the first client wireless device with the first acknowledgment, signal quality information and location data associated with a location of the first client wireless device, wherein the signal quality information includes at least one of received signal strength information (RSSI), channel state information (CSI), or physical layer (PHY) rate; and transmitting, based on the signal quality information and the location data, a subsequent frame of the plurality of frames to the first client wireless device via one of the second directional antenna, a third directional antenna, or the omnidirectional antenna.

16. A wireless device comprising:

a radio;
a first directional antenna;
a second directional antenna;
an omnidirectional antenna;
a switch selectively coupled between the radio and the first directional antenna, the second directional antenna, and the omnidirectional antenna; and a processor coupled to the switch, wherein the processor is to, for a second frame of a plurality of frames:

determine, based on an arbitration table, a second destination medium access control (MAC) address of a second client wireless device, wherein the arbitration table includes for each frame of the plurality of frames: (a) a frame identifier, (b) destination MAC address for the frame, (c) identifier of an antenna for transmitting the frame, and (d) identifier of an antenna for receiving acknowledgement data for the frame;

add, to the second frame, metadata comprising the second destination MAC address and an identifier of the second directional antenna for both (c) and (d) retrieved from the arbitration table;

cause, using the metadata in the second frame, the switch to couple the radio to the second directional antenna;

transmit the second frame to the second client wireless device via the second directional antenna, wherein the second client wireless device is located along a second direction with respect to the wireless device;

cause, using the metadata in the second frame, the switch to retain the radio coupled to the second directional antenna; and receive a second acknowledgment, corresponding to the second frame, from the second client wireless device via the second directional antenna.

17. The wireless device of claim 16, further comprising a third directional antenna selectively coupled to the radio and to the switch and configured to radiate radio frequency energy in a third direction, wherein the processor is further to:

transmit a probing signal via the first directional antenna, the second directional antenna, and the third directional antenna;

receive, from the second client wireless device in response to the probing signal, a first signal strength value via the first directional antenna, a second signal strength value via the second directional antenna, and a third signal strength value via the third directional antenna;

determine that the third signal strength value is greater than the first and the second signal strength values; and transmit a subsequent frame of the plurality of frames to the second client wireless device via the third directional antenna, wherein the second client wireless device has moved from being located along the second direction to being located along the third direction.

18. The wireless device of claim 16, further comprising a third directional antenna selectively coupled to the radio and to the switch, wherein the processor is further to:

receive, for the second client wireless device, signal quality information and criteria data, the criteria data comprising at least one of bandwidth requirements, traffic patterns, supported modes, or application level priority for the second client wireless device; and transmit, based on the signal quality information and the criteria data, a subsequent frame of the plurality of frames to the second client wireless device via one of the second directional antenna, the third directional antenna, or the omnidirectional antenna.

19. The wireless device of claim 16, wherein the processor is further to:

retrieve, from the arbitration table for a third frame of the plurality of frames, a third destination MAC address of a third client wireless device and the identifier of the omnidirectional antenna;

cause the switch to couple the radio to the omnidirectional antenna;

transmit the third frame to the third client wireless device via the omnidirectional antenna;

receive, from the third client wireless device, information about a weak hidden node interrupting transmission by the omnidirectional antenna; and transmit, based on the information about the weak hidden node, a subsequent frame of the plurality of frames associated with the third destination MAC address via one of the first directional antenna or the second directional antenna.

20. The wireless device of claim 16, wherein the processor is further to:

retrieve, from the arbitration table for a third frame of the plurality of frames, a third destination MAC address of a third client wireless device, the identifier of the second directional antenna, and the identifier of the omnidirectional antenna;

cause the switch to couple the radio to the second directional antenna;

transmit the third frame to the third client wireless device via the second directional antenna;

receive, from the third client wireless device, information about detection of a strong hidden node interrupting transmission by the second directional antenna; and transmit, based on the information about the strong hidden node, a subsequent frame of the plurality of frames associated with the third destination MAC address via the omnidirectional antenna.

* * * * *